(12) United States Patent
Liu et al.

(10) Patent No.: US 11,943,609 B2
(45) Date of Patent: *Mar. 26, 2024

(54) BLUETOOTH COMMUNICATION SYSTEM CAPABLE OF INCREASING GENERATION EFFICIENCY OF CYPHER KEYS REQUIRED FOR DATA TRANSMISSION BETWEEN BLUETOOTH HOST DEVICE AND BLUETOOTH DEVICE SET, AND RELATED BLUETOOTH DEVICE SET

(71) Applicant: Realtek Semiconductor Corp., Hsinchu (TW)

(72) Inventors: Yu Hsuan Liu, Hsinchu (TW); Yung Chieh Lin, Hsinchu (TW); Po Sheng Chiu, Hsinchu (TW)

(73) Assignee: Realtek Semiconductor Corp., Hsinchu (TW)

(*) Notice: Subject to any disclaimer, the term of this patent is extended or adjusted under 35 U.S.C. 154(b) by 285 days.

This patent is subject to a terminal disclaimer.

(21) Appl. No.: 17/572,081

(22) Filed: Jan. 10, 2022

(65) Prior Publication Data
US 2022/0224526 A1 Jul. 14, 2022

Related U.S. Application Data

(60) Provisional application No. 63/135,720, filed on Jan. 10, 2021.

(51) Int. Cl.
*H04L 9/08* (2006.01)
*G06F 3/0482* (2013.01)
(Continued)

(52) U.S. Cl.
CPC ........ *H04W 12/041* (2021.01); *G06F 3/0482* (2013.01); *H04L 9/0866* (2013.01);
(Continued)

(58) Field of Classification Search
CPC ... H04W 12/041; H04W 12/03; H04W 12/50; H04W 12/068; H04W 12/037;
(Continued)

(56) References Cited

U.S. PATENT DOCUMENTS

| 7,747,223 B2 | 8/2010 | Wilson et al. |
| 2015/0359022 A1 | 12/2015 | Lau et al. |

(Continued)

FOREIGN PATENT DOCUMENTS

| CN | 105471481 A | 4/2016 |
| CN | 109688573 A | 4/2019 |

(Continued)

OTHER PUBLICATIONS

Taiwanese Office Action and Search Report for Taiwanese Application No. 111144680, dated Jan. 31, 2023, with an English translation of the Taiwanese Search Report.

(Continued)

*Primary Examiner* — Brian F Shaw
(74) *Attorney, Agent, or Firm* — Birch, Stewart, Kolasch & Birch, LLP

(57) ABSTRACT

A Bluetooth communication system includes: a Bluetooth host device; and a Bluetooth device set which including a first member device and a second member device. The first member device generates a first resolvable set identifier corresponding to the first member device, and generates and transmits target Bluetooth packets containing the first resolvable set identifier to the Bluetooth host device. The second member device generates a resolvable set identifier corresponding to the second member device according to a device set identification information. The Bluetooth host device identifies the first member device as a first privileged device according to the position of the first resolvable set identifier, and transmits a first privileged pairing notice to (Continued)

the first member device and generates a first cypher key. The first member device further generates a second cypher key corresponding to the first cypher key after receiving the first privileged pairing notice.

10 Claims, 13 Drawing Sheets

(51) Int. Cl.
| | |
|---|---|
| *H04L 9/14* | (2006.01) |
| *H04W 4/80* | (2018.01) |
| *H04W 8/00* | (2009.01) |
| *H04W 12/03* | (2021.01) |
| *H04W 12/037* | (2021.01) |
| *H04W 12/041* | (2021.01) |
| *H04W 12/0471* | (2021.01) |
| *H04W 12/50* | (2021.01) |
| *H04W 12/55* | (2021.01) |
| *H04W 76/15* | (2018.01) |
| *H04W 84/18* | (2009.01) |

(52) U.S. Cl.
CPC .............. *H04L 9/14* (2013.01); *H04W 4/80* (2018.02); *H04W 8/005* (2013.01); *H04W 12/03* (2021.01); *H04W 12/037* (2021.01); *H04W 12/0471* (2021.01); *H04W 12/50* (2021.01); *H04W 12/55* (2021.01); *H04W 76/15* (2018.02); *H04W 84/18* (2013.01)

(58) Field of Classification Search
CPC . H04W 12/04; H04W 12/0471; H04W 12/55; H04W 4/80; H04W 8/005; H04W 76/15; H04W 76/14; H04W 84/18; G06F 3/0482; H04L 9/0866; H04L 9/14; H04L 2209/805
See application file for complete search history.

(56) References Cited

U.S. PATENT DOCUMENTS

| | | | |
|---|---|---|---|
| 2016/0277875 A1 | 9/2016 | Ivanova et al. | |
| 2018/0067712 A1 | 3/2018 | Behzadi et al. | |
| 2019/0356478 A1* | 11/2019 | Young | ................. H04L 9/0866 |
| 2020/0008048 A1* | 1/2020 | Takahashi | ............... H04W 8/24 |
| 2021/0076435 A1* | 3/2021 | Cheong | .................. H04W 4/80 |

FOREIGN PATENT DOCUMENTS

| | | |
|---|---|---|
| EP | 1 672 844 A1 | 6/2006 |
| WO | WO2020/188429 A1 | 9/2020 |

OTHER PUBLICATIONS

Taiwanese Office Action and Search Report for Taiwanese Application No. 111101003, dated May 5, 2022, with English translation.
Taiwanese Office Action and Search Report for Taiwanese Application No. 111101004, dated Apr. 7, 2022, with English translation.
Taiwanese Office Action and Search Report for Taiwanese Application No. 111101005, dated Apr. 7, 2022, with English translation.
Taiwanese Office Action and Search Report for Taiwanese Application No. 111101000, dated May 26, 2022, with English translation.
Taiwanese Office Action and Search Report for Taiwanese Application No. 111101001, dated May 13, 2022, with English translation.
U.S. Office Action for U.S. Appl. No. 17/572,042, dated Dec. 21, 2023.
U.S. Office Action for U.S. Appl. No. 17/572,220, dated Dec. 28, 2023.
U.S. Office Action for U.S. Appl. No. 17/572,367, dated Jan. 4, 2024.

* cited by examiner

BLUETOOTH COMMUNICATION SYSTEM CAPABLE OF INCREASING GENERATION EFFICIENCY OF CYPHER KEYS REQUIRED FOR DATA TRANSMISSION BETWEEN BLUETOOTH HOST DEVICE AND BLUETOOTH DEVICE SET, AND RELATED BLUETOOTH DEVICE SET

CROSS-REFERENCE TO RELATED APPLICATIONS

This application claims the benefit of priority to U.S. Provisional Application Ser. No. 63/135,720, filed on Jan. 10, 2021; the entirety of which is incorporated herein by reference for all purposes.

BACKGROUND

The disclosure generally relates to Bluetooth technologies and, more particularly, to a Bluetooth communication system and a related Bluetooth device set capable of increasing generation efficiency of cypher keys required for data transmission between a Bluetooth host device and the Bluetooth device set.

There are two categories of Bluetooth technologies: Classic Bluetooth/Legacy Bluetooth technology and BLE (Bluetooth Low Energy) technology. The BLE technology is incompatible (or not completely compatible) with the Classic Bluetooth/Legacy Bluetooth technology, but the two technologies can coexist in the same Bluetooth device or the same Bluetooth chip. In other words, a single Bluetooth device or a single Bluetooth chip may be designed to support both the BLE technology and the Classic Bluetooth/Legacy Bluetooth technology, or may be designed to support only one category of the Bluetooth communication standards. The newly launched Bluetooth LE Audio (BLE Audio) technology (hereinafter referred to as the BLE Audio technology) based on Bluetooth Core Specification Version 5.2 is a significant update to the technical specifications of audio transmission over the past twenty years of development of Bluetooth technologies. The main advantage of the BLE Audio technology is that the BLE Audio technology can transmit audio with higher quality while significantly reducing power consumption. It is foreseeable that the market demand for Bluetooth device set (e.g., a pair of Bluetooth earphones, a group of multi-channel Bluetooth speakers, or the like) that can support the BLE Audio technology will become higher and higher.

As is well known in related art, when a Bluetooth device set which adopts the Classic Bluetooth/Legacy Bluetooth technology connects to a Bluetooth host device (e.g., a cell phone, a computer, or the like), the Bluetooth host device treats multiple member devices in the Bluetooth device set as a single Bluetooth device. Therefore, the Bluetooth host device only needs to establish a connection with one of the multiple member devices in the Bluetooth device set.

However, according to specification of the BLE Audio technology, when a Bluetooth device set which supports the BLE Audio technology wants to connect to a Bluetooth host device, the Bluetooth host device has to conduct Bluetooth pairing procedure with all member devices in the Bluetooth device set one by one, so that the Bluetooth host device can successfully transmit audio data or other data to all member devices in the Bluetooth device set. According to the existing technology, the Bluetooth pairing process between the Bluetooth host device and respective member devices in the Bluetooth device set will be quite lengthy. One of the main reasons is that the Bluetooth host device has to spend a lot of time negotiating with individual member devices one by one regarding the relevant parameters of the cypher keys to be generated by both parties. The greater the number of member devices in the Bluetooth device set, the longer the time it takes for the Bluetooth host device and the Bluetooth device set in generating the required cypher keys.

Accordingly, if the generation efficiency of the cypher keys required for subsequent data transmission between the Bluetooth host device and the Bluetooth device set cannot be improved, it will seriously hinder the development prospects of the BLE Audio technology in the related applications of the Bluetooth device sets.

SUMMARY

An example embodiment of a Bluetooth communication system is disclosed, comprising: a Bluetooth host device, comprising: a host-side communication circuit; a host-side cypher key generation circuit; a processing circuit, coupled with the host-side communication circuit and the host-side cypher key generation circuit, arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and to operably generate one or more target Bluetooth advertising packets containing an auto-pair request and a device information of the first member device, and to operably utilize the first communication circuit to transmit the one or more target Bluetooth advertising packets to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit, and arranged to operably generate a second resolvable set identifier corresponding to the second member device according to the device set identification information; wherein the host-side communication circuit is further arranged to operably receive the one or more target Bluetooth advertising packets; wherein the processing circuit is further arranged to operably identify the first member device as a first privileged device according to the auto-pair request in the one or more target Bluetooth advertising packets, and after identifying the first member device as the first privileged device, the processing circuit is arranged to operably transmits a first privileged pairing notice to the first member device through the host-side communication circuit, and to operably generate a first cypher key; wherein the first control circuit is further arranged to operably generate a second cypher key corresponding to the first cypher key after the first privileged pairing notice is received by the first communication circuit.

An example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, to operably generate one or more target Bluetooth advertising packets containing an auto-pair request and a device information of the first member device, and to operably utilize the first communication circuit to transmit the one or more target Bluetooth advertising packets to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device identifies the first member device as a first privileged device according to the auto-pair request in the one or more target Bluetooth advertising packets, and after identifying the first member device as the first privileged device, the Bluetooth host device transmits a first privileged pairing notice to the first member device, and generates a first cypher key; wherein the first control circuit is further arranged to operably generate a second cypher key corresponding to the first cypher key after the first privileged pairing notice is received by the first communication circuit.

Another example embodiment of a Bluetooth communication system is disclosed, comprising: a Bluetooth host device, comprising: a host-side communication circuit; a host-side cypher key generation circuit; and a processing circuit, coupled with the host-side communication circuit and the host-side cypher key generation circuit, and arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably generate one or more target Bluetooth advertising packets containing a device information of the first member device and the first resolvable set identifier, and arranged to operably utilize the first communication circuit to transmit the one or more target Bluetooth advertising packets to the Bluetooth host device; wherein the second member device comprises: a second communication circuit, arranged to operably conduct wireless communications with the host-side communication circuit; and a second control circuit, coupled with the second communication circuit, arranged to operably control operations of the second communication circuit, and arranged to operably generate a second resolvable set identifier corresponding to the second member device according to the device set identification information; wherein the host-side communication circuit is further arranged to operably receive the one or more target Bluetooth advertising packets; wherein the processing circuit is further arranged to operably control a display device to display a candidate device list, and to display a single device item for representing the Bluetooth device set in the candidate device list, but does not simultaneously display two device items for respectively representing the first member device and the second member device in the candidate device list; wherein the processing circuit is further arranged to operably identify the first member device as a first privileged device according to a position of the first resolvable set identifier in the one or more target Bluetooth advertising packets, and after identifying the first member device as the first privileged device, the processing circuit is further arranged to operably transmit a first privileged pairing notice to the first member device through the host-side communication circuit, and to operably generate a first cypher key; wherein the first control circuit is further arranged to operably generate a second cypher key corresponding to the first cypher key after the first privileged pairing notice is received by the first communication circuit.

Another example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably generate one or more target Bluetooth advertising packets containing a device information of the first member device and the first resolvable set identifier, and arranged to operably utilize the first communication circuit to transmit the one or more target Bluetooth advertising packets to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device controls a display device to display a candidate device list, and to display a single device item for representing the Bluetooth device set in the candidate device list, but does not simultaneously display two device items for respectively representing the first member device and the second member device in the candidate device list; wherein the Bluetooth host device identifies the first member device as a first privileged device according to a position of the first resolvable set identifier in the one or more target Bluetooth advertising packets, and after identifying the first member device as the first privileged device, the Bluetooth host device transmits a first privileged pairing notice to the first member device and generates a first cypher key; wherein the first control circuit is further arranged to operably generate a second cypher key corresponding to the first cypher key after the first privileged pairing notice is received by the first communication circuit.

Another example embodiment of a Bluetooth communication system is disclosed, comprising: a Bluetooth host device, comprising: a host-side communication circuit; a host-side cypher key generation circuit; and a processing circuit, coupled with the host-side communication circuit and the host-side cypher key generation circuit, and arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; wherein the second member device comprises: a second communication circuit, arranged to operably conduct wireless communications with the host-side communication circuit; and a second control circuit, coupled with the second communication circuit, arranged to operably control operations of the second communication circuit, and arranged to operably generate a second resolvable set identifier corresponding to the second member device according to the device set identification information; wherein the processing circuit is further arranged to operably control a display device to display a candidate device list, and to display a single device item for representing the Bluetooth device set in the candidate device list, but does not simultaneously display two device items for respectively representing the first member device and the second member device in the candidate device list; wherein the processing circuit is further arranged to operably utilize the host-side communication circuit to establish a connection with the first member device and to conduct a pairing procedure to generate a first cypher key after receiving a selection command issued by an user; wherein the first control circuit is further arranged to operably utilize the first communication circuit to establish a connection with the Bluetooth host device and to conduct a pairing procedure to generate a second cypher key corresponding to the first cypher key.

Another example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device controls a display device to display a candidate device list, and to display a single device item for representing the Bluetooth device set in the candidate device list, but does not simultaneously display two device items for respectively representing the first member device and the second member device in the candidate device list; wherein the Bluetooth host device establishes a connection with the first member device and conducts a pairing procedure to generate a first cypher key after receiving a selection command issued by an user; wherein the first control circuit is further arranged to operably utilize the first communication circuit to establish a connection with the Bluetooth host device and to conduct a pairing procedure to generate a second cypher key corresponding to the first cypher key.

Another example embodiment of a Bluetooth communication system is disclosed, comprising: a Bluetooth host device, comprising: a host-side communication circuit; a host-side cypher key generation circuit; and a processing circuit, coupled with the host-side communication circuit and the host-side cypher key generation circuit, and arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit, and arranged to operably generate a second resolvable set identifier corresponding to the second member device according to the device set identification information; wherein the processing circuit is further arranged to operably control a display device to display a candidate device list, and to display a single device item for representing the Bluetooth device set in the candidate device list, but does not simultaneously display two device items for respectively representing the first member device and the second member device in the candidate device list; wherein the processing circuit is further arranged to operably utilize the host-side communication circuit to establish a connection with the first member device and to conduct a pairing procedure to generate a first cypher key after receiving a selection command issued by an user; wherein the first control circuit is further arranged to operably utilize the first communication circuit to establish a connection with the Bluetooth host device and to conduct a pairing procedure to generate a second cypher key corresponding to the first cypher key.

Another example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device controls a display device to display a candidate device list, and to display a single device item for representing the Bluetooth device set in the candidate device list, but does not simultaneously display two device items for respectively representing the first member device and the second member device in the candidate device list; wherein the Bluetooth host device establishes a connection with the first member device and conducts a pairing procedure to generate a first cypher key after receiving a selection command issued by an user; wherein the first control circuit is further arranged to operably utilize the first communication circuit to establish a connection with the Bluetooth host device and to conduct a pairing procedure to generate a second cypher key corresponding to the first cypher key.

Another example embodiment of a Bluetooth communication system is disclosed, comprising: a Bluetooth host device, comprising: a host-side communication circuit; a host-side cypher key generation circuit; and a processing circuit, coupled with the host-side communication circuit and the host-side cypher key generation circuit, and arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit, and arranged to operably generate a second resolvable set identifier corresponding to the second member device according to the device set identification information; wherein the processing circuit is further arranged to operably control a display device to display a candidate device list, and to display a single device item for representing the Bluetooth device set in the candidate device list, but does not simultaneously display two device items for respectively representing the first member device and the second member device in the candidate device list; wherein the processing circuit is further arranged to operably utilize the host-side communication circuit to establish a connection with the first member device after receiving a selection command issued by an user, and to operably generate a first cypher key according to instructions of the first member device and the device information of the first member device; wherein the first control circuit is further arranged to operably utilize the first communication circuit to establish a connection with the Bluetooth host device, and to operably generate a second cypher key corresponding to the first cypher key according to a device information of the Bluetooth host device.

Another example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device controls a display device to display a candidate device list, and to display a single device item for representing the Bluetooth device set in the candidate device list, but does not simultaneously display two device items for respectively representing the first member device and the second member device in the candidate device list; wherein the Bluetooth host device establishes a connection with the first member device after receiving a selection command issued by an user, and generates a first cypher key according to instructions of the first member device and the device information of the first member device; wherein the first control circuit is further arranged to operably utilize the first communication circuit to establish a connection with the Bluetooth host device, and to operably generate a second cypher key corresponding to the first cypher key according to a device information of the Bluetooth host device.

Another example embodiment of a Bluetooth communication system is disclosed, comprising: a Bluetooth host device, comprising: a host-side communication circuit; a host-side cypher key generation circuit; and a processing circuit, coupled with the host-side communication circuit and the host-side cypher key generation circuit, and arranged to operably control operations of the host-side communication circuit and the host-side cypher key generation circuit; and a Bluetooth device set, comprising at least a first member device and a second member device; wherein the first member device comprises: a first communication circuit, arranged to operably conduct wireless communications with the host-side communication circuit; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit, and arranged to operably generate a second resolvable set identifier corresponding to the second member device according to the device set identification information; wherein the processing circuit is further arranged to operably control a display device to display a candidate device list, and to display a single device item for representing the Bluetooth device set in the candidate device list, but does not simultaneously display two device items for respectively representing the first member device and the second member device in the candidate device list; wherein the processing circuit is further arranged to operably utilize the host-side communication circuit to transmit a first parameter or a first field indication to the first member device after receiving a selection command issued by an user, and to operably execute a predetermined cypher key algorithm according to the first parameter to generate a first cypher key; wherein the first control circuit is further arranged to operably utilize the first communication circuit to receive the first parameter or the first field indication, and to operably execute the predetermined cypher key algorithm according to the first parameter to generate a second cypher key corresponding to the first cypher key.

Another example embodiment of a Bluetooth device set of a Bluetooth communication system is disclosed, comprising: a first member device, comprising: a first communication circuit, arranged to operably conduct wireless communications with a Bluetooth host device in the Bluetooth communication system; a first cypher key generation circuit; and a first control circuit, coupled with the first communication circuit and the first cypher key generation circuit, and arranged to operably generate a first resolvable set identifier corresponding to the first member device according to a device set identification information corresponding to the Bluetooth device set, and arranged to operably utilize the first communication circuit to transmit a device information of the first member device to the Bluetooth host device; a second member device, comprising: a second communication circuit, arranged to operably conduct wireless communications with the Bluetooth host device; and a second control circuit, coupled with the second communication circuit, and arranged to operably control operations of the second communication circuit, and arranged to operably generate a second resolvable set identifier corresponding to the second member device according to the device set identification information; wherein the Bluetooth host device controls a display device to display a candidate device list, and to display a single device item for representing the Bluetooth device set in the candidate device list, but does not simultaneously display two device items for respectively representing the first member device and the second member device in the candidate device list; wherein the Bluetooth host device transmits a first parameter or a first field indication to the first member device after receiving a selection command issued by an user, and executes a predetermined cypher key algorithm according to the first parameter to generate a first cypher key; wherein the first control circuit is further arranged to operably utilize the first communication circuit to receive the first parameter or the first field indication, and to operably execute the predetermined cypher key algorithm according to the first parameter to generate a second cypher key corresponding to the first cypher key.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
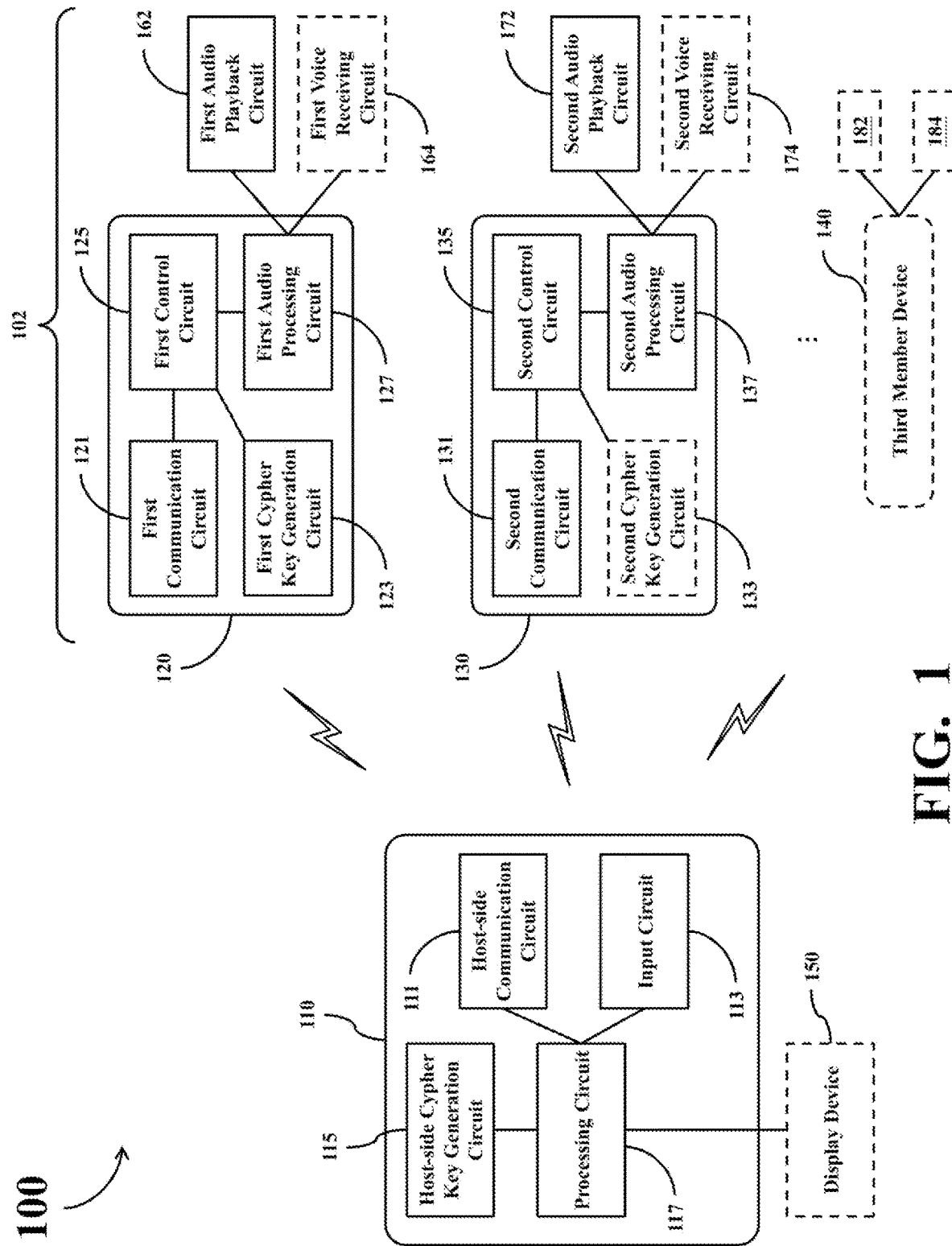
FIG. 1 shows a simplified functional block diagram of a Bluetooth communication system according to one embodiment of the present disclosure.

FIG. 1 shows a simplified functional block diagram of a Bluetooth communication system 100 according to one embodiment of the present disclosure. The Bluetooth communication system 100 comprises a Bluetooth host device 110 and a Bluetooth device set 102, wherein the Bluetooth device set 102 comprises a plurality of member devices.

In practical applications, the plurality of member devices in the Bluetooth device set 102 may utilize various approaches complying with the Bluetooth communication standards to create a Bluetooth piconet, and may conduct various instruction transmission or data transmission through the Bluetooth piconet. Alternatively, the plurality of member devices in the Bluetooth device set 102 may collectively form a coordinate set complying with Bluetooth communication standards.

In this embodiment, the Bluetooth host device 110 and all member devices in the Bluetooth device set 102 support the Bluetooth LE Audio (BLE Audio) technology (hereinafter referred to as BLE Audio technology) specified by the Bluetooth Core Specification Version 5.2 or newer versions. Accordingly, an user may connect the Bluetooth host device 110 with the Bluetooth device set 102 to utilize the Bluetooth device set 102 to conduct various audio playback operations.

For example, two member devices in the Bluetooth device set 102 may cooperate with appropriate audio playback circuits to collectively form a pair of Bluetooth earphones or a 2.0 channel speaker set. For another example, three member devices in the Bluetooth device set 102 may cooperate with appropriate audio playback circuits to collectively form a 2.1 channel speaker set. For another example, sis member devices in the Bluetooth device set 102 may cooperate with appropriate audio playback circuits to collectively form a 5.1 channel speaker set. For another example, eight member devices in the Bluetooth device set 102 may cooperate with appropriate audio playback circuits to collectively form a 7.1 channel speaker set.

In order to reduce the complexity of the drawing, only three exemplary member devices are shown in FIG. 1, which are a first member device 120, a second member device 130, and a third member device 140. In the embodiment of FIG. 1, the first member device 120 is coupled with a first audio playback circuit 162 and a first voice receiving circuit 164, the second member device 130 is coupled with a second audio playback circuit 172 and a second voice receiving circuit 174, while the third member device 140 is coupled with a third audio playback circuit 182 and a third voice receiving circuit 184.

The user may connect the Bluetooth host device 110 with the first member device 120, the second member device 130, and the third member device 140 in the Bluetooth device set 102, so as to utilize above member devices to control related audio playback circuits to playback audio data transmitted from the Bluetooth host device 110 by adopting the BLE Audio technology.

In the embodiment of FIG. 1, the Bluetooth host device 110 comprises a host-side communication circuit 111, an input circuit 113, a host-side cypher key generation circuit 115, and a processing circuit 117. The first member device 120 comprises a first communication circuit 121, a first cypher key generation circuit 123, a first control circuit 125, and a first audio processing circuit 127. The second member device 130 comprises a second communication circuit 131, a second cypher key generation circuit 133, a second control circuit 135, and a second audio processing circuit 137.

In the Bluetooth host device 110, the host-side communication circuit 111 is arranged to operably receive and transmit various Bluetooth packets. The input circuit 113 is arranged to operably various commands issued by the user. The host-side cypher key generation circuit 115 is arranged to operably execute various selected or predetermined cypher key algorithms to generate cypher keys required by the Bluetooth host device 110 for conducting subsequent Bluetooth data transmissions with respective member devices in the Bluetooth device set 102. The processing circuit 117 is coupled with the host-side communication circuit 111, the input circuit 113, and the host-side cypher key generation circuit 115. The processing circuit 117 is arranged to operably generate various Bluetooth packets to be transmitted by the host-side communication circuit 111, arranged to operably parse various Bluetooth packets received by the host-side communication circuit 111 to obtain related data or instructions, and further arranged to operably control operations of the host-side cypher key generation circuit 115. The processing circuit 117 is further arranged to operably control operations of the Bluetooth host device 110 according to various operating commands issued by the user through the input circuit 113.

The term "Bluetooth packet" used throughout the description and the claims also encompass various protocol data units (PDUs) specified by various Bluetooth communication standards.

In some embodiments, the processing circuit 117 is further coupled with a display device 150, and arranged to operably control operations of the display device 150, so as to display related information or images to the user.

In the first member device 120, the first communication circuit 121 is arranged to operably receive and transmit various Bluetooth packets. The first cypher key generation circuit 123 is arranged to operably execute various selected or predetermined cypher key algorithms to generate cypher keys required by the first member device 120 for conducting subsequent Bluetooth data transmissions with the Bluetooth host device 110. The first control circuit 125 is coupled with the first communication circuit 121 and the first cypher key generation circuit 123. The first control circuit 125 is arranged to operably generate various Bluetooth packets to be transmitted by the first communication circuit 121, and arranged to operably parse various Bluetooth packets received by the first communication circuit 121 to acquire related data or instructions, and further arranged to operably control the cypher key generating operations of the first cypher key generation circuit 123. In addition, the first control circuit 125 is further arranged to operably adjust the clock signals employed by the first member device 120, so as to synchronize a piconet clock utilized among the first member device 120 and other Bluetooth devices.

The first audio processing circuit 127 is coupled with the first control circuit 125, the first audio playback circuit 162, and the first voice receiving circuit 164. The first audio processing circuit 127 is arranged to operably process the audio data transmitted from the Bluetooth host device 110 (e.g., to encode or decode the audio data, and/or to conduct format conversion on the audio data) according to the instructions of the first control circuit 125, and arranged to operably control the first audio playback circuit 162 to playback contents of the audio data. The first audio processing circuit 127 is further arranged to operably encode the sounds received by the first voice receiving circuit 164 to generate related sound data.

In the second member device 130, the second communication circuit 131 is arranged to operably receive and transmit various Bluetooth packets. The second cypher key generation circuit 133 is arranged to operably execute various selected or predetermined cypher key algorithms to generate cypher keys required by the second member device 130 for conducting subsequent Bluetooth data transmissions with the Bluetooth host device 110. The second control circuit 135 is coupled with the second communication circuit 131 and the second cypher key generation circuit 133. The second control circuit 135 is arranged to operably generate various Bluetooth packets to be transmitted by the second communication circuit 131, and arranged to operably parse various Bluetooth packets received by the second communication circuit 131 to acquire related data or instructions, and further arranged to operably control the cypher key generating operations of the second cypher key generation circuit 133. In addition, the second control circuit 135 is further arranged to operably adjust the clock signals employed by the second member device 130, so as to synchronize a piconet clock utilized among the second member device 130 and other Bluetooth devices.

The second audio processing circuit 137 is coupled with the second control circuit 135, the second audio playback circuit 172, and the second voice receiving circuit 174. The second audio processing circuit 137 is arranged to operably process the audio data transmitted from the Bluetooth host device 110 (e.g., to encode or decode the audio data, and/or to conduct format conversion on the audio data) according to the instructions of the second control circuit 135, and arranged to operably control the second audio playback circuit 172 to playback contents of the audio data. The second audio processing circuit 137 is further arranged to operably encode the sounds received by the second voice receiving circuit 174 to generate related sound data.

In some embodiments, the first control circuit 125 is further arranged to operably control the first member device 120 to act as a Bluetooth Central in a Bluetooth piconet, and to operably adjust the clock signals employed by the first member device 120, so as to synchronize a piconet clock utilized among the first member device 120 and other Bluetooth devices. In this situation, the second control circuit 135 is further arranged to operably control the second member device 130 to act as a Bluetooth Peripheral in the Bluetooth piconet, and to operably adjust the clock signals employed by the second member device 130, so as to synchronize the piconet clock utilized between the second member device 130 and the first member device 120.

In this embodiment, each of the Bluetooth host device 110, the first member device 120, and the second member device 130 supports the BLE Audio technology. In this situation, the processing circuit 117 of the Bluetooth host device 110 is further arranged to operably generate audio data complying with related specifications of the BLE Audio technology (hereinafter referred to as BLE audio data), and to operably utilize the host-side communication circuit 111 transmit the BLE audio data to all member devices in the Bluetooth device set 102. The first control circuit 125 of the first member device 120 is further arranged to operably utilize the first audio processing circuit 127 to process the BLE audio data transmitted from the Bluetooth host device 110, and to operably instruct the first audio processing circuit 127 to control the first audio playback circuit 162 to playback the contents of the BLE audio data. Similarly, the second control circuit 135 of the second member device 130 is further arranged to operably utilize the second audio processing circuit 137 to process the BLE audio data transmitted from the Bluetooth host device 110, and to operably instruct the second audio processing circuit 137 to control the second audio playback circuit 172 to playback the contents of the BLE audio data.

In some embodiments, the host-side communication circuit 111 of the Bluetooth host device 110 is further arranged to operably adopt various wired network transmission technologies or various Radio Access Technologies (RATs) to receive the voice data transmitted from a remote device (not shown in figures) through various networks (e.g., Internet, mobile communication networks, or various private networks). The processing circuit 117 is arranged to operably decode the voice data received by the host-side communication circuit 111, and arranged to operably utilize the host-side communication circuit 111 to transmit decoded voice data to the first member device 120 and/or the second member device 130 in the Bluetooth device set 102 in the form of Bluetooth packets, and to operably instruct the first member device 120 and/or the second member device 130 to utilize the first audio playback circuit 162 and/or the second audio playback circuit 172 to playback the contents of the voice data.

The aforementioned RAT may be various 2nd Generation (2G) mobile communication technologies, various 3rd Generation (3G) mobile communication technologies, various 4th Generation (4G) mobile communication technologies, various 5th Generation (5G) mobile communication technologies, various wireless networking technologies specified by the IEEE 802.11 series standards, various Internet-of-Thing (IoT) communication technologies, various Narrow Band Internet of Thing (NB-IoT) communication technologies, various Vehicle-to-Vehicle communication technologies, various Vehicle-to-Everything (V2X) communication technologies, various satellite communication technologies, various wireless communication technologies proposed by other standard setting organizations, or the like.

On the other hand, the first member device 120 and/or the second member device 130 may utilize the first voice receiving circuit 164 and/or the second voice receiving circuit 174 to receive the user's voice, and may utilize the first audio processing circuit 127 and/or the second audio processing circuit 137 to generate related sound data. The first member device 120 and/or the second member device 130 may further utilize the first communication circuit 121 and/or the second communication circuit 131 to transmit the aforementioned sound data to the Bluetooth host device 110. In this situation, the processing circuit 117 of the Bluetooth host device 110 may further adopt the aforementioned wired network transmission technologies or RATs to transmit the sound data generated by the Bluetooth device set 102 to the remote device through various appropriate networks.

As a result, the user is enabled to utilize the cooperation of the Bluetooth host device 110 and the Bluetooth device set 102 to realize voice communication with the remote device.

In practice, the host-side communication circuit 111 in the Bluetooth host device 110 may be realized with appropriate wireless transceiver circuits supporting the Bluetooth communication protocol of the Bluetooth Core Specification Version 5.2 or a newer version. Alternatively, the host-side communication circuit 111 may be realized with various hybrid communication circuits supporting above Bluetooth communication protocol and also supporting the aforementioned wired network transmission technologies or RATs. If needed, the host-side communication circuit 111 may be coupled with an additional antenna (not shown in figures).

The input circuit 113 may be realized with various appropriate circuits capable of receiving the commands issued by the user, such as a keyboard, a mouse, a touch screen, a voice activated device, a gesture sensing device, or a hybrid of the above various devices.

The host-side cypher key generation circuit 115 may be realized with various digital computing circuits, microprocessors, security modules, or Application Specific Integrated Circuits (ASICs) having cypher key computing capabilities.

The processing circuit 117 may be realized with an appropriate packet demodulation circuit, a digital computing circuit, a microprocessor, an ASIC, a single processor module, a combination of multiple processor modules, a single computer system, a combination of multiple computer systems, a single server, a combination of multiple servers, or a cloud computing system having appropriate computing capabilities and capable of parsing and generating Bluetooth packets adopting the BLE Audio technology specified by the Bluetooth Core Specification Version 5.2 or newer versions.

In practical applications, different functional blocks of the aforementioned Bluetooth host device 110 may be realized with separate circuits or may be integrated into a single IC chip or a single device.

For example, the input circuit 113 and/or the host-side cypher key generation circuit 115 may be integrated into the processing circuit 117. For another example, the input circuit 113 and the display device 150 may be integrated into a single touch screen.

Alternatively, all functional blocks of the Bluetooth host device 110 may be integrated into a single IC chip, a mobile communication device (e.g., a cell phone), a wearable device, a tablet computer, a notebook computer, a desktop computer, an audio broadcast system, a voice guidance system, a voice broadcasting system, a vehicular communication device, a satellite communication device, a smart TC, a Bluetooth smart speaker, or the like.

In practice, each of the first communication circuit 121 and the second communication circuit 131 in the Bluetooth device set 102 may be realized with an appropriate Bluetooth communication circuit capable of supporting the Bluetooth communication protocol of the Bluetooth Core Specification Version 5.2 or newer versions. If needed, the first communication circuit 121 and the second communication circuit 131 may be respectively coupled with additional antennas (not shown in figures).

Each of the first cypher key generation circuit 123 and the second cypher key generation circuit 133 may be realized with appropriate digital computing circuits, microprocessors, security modules, or ASICs having cypher key computing capabilities.

Each of the first control circuit 125 and the second control circuit 135 may be realized with an appropriate packet demodulation circuit, a digital computing circuit, a microprocessor, a single processor module, a combination of multiple processor modules, or an ASIC having appropriate computing capabilities and capable of parsing and generating Bluetooth packets adopting the BLE Audio technology specified by the Bluetooth Core Specification Version 5.2 or newer versions.

In some embodiments, the aforementioned first communication circuit 121 and second communication circuit 131 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned first control circuit 125 and second control circuit 135 should be designed to be able to parse and generate Bluetooth packets defined by the Bluetooth communication protocol of earlier Bluetooth versions.

Each of the first audio processing circuit 127 and the second audio processing circuit 137 may be realized with digital computing circuits, microprocessors, ASICs, or digital-to-analog converters (DACs) capable of conducting various encoding/decoding processing and/or data format conversion on audio data.

In some embodiments, the first audio processing circuit 127 and the second audio processing circuit 137 may be respectively integrated into the first control circuit 125 and the second control circuit 135.

Different functional blocks of the aforementioned first member device 120 may be realized with separate circuits or may be integrated into a single IC chip, a single wearable Bluetooth device, or a single Bluetooth speaker.

Similarly, different functional blocks of the aforementioned second member device 130 may be realized with separate circuits or may be integrated into a single IC chip, a single wearable Bluetooth device, or a single Bluetooth speaker.

In addition, each of the first audio playback circuit 162 and the second audio playback circuit 172 may be realized with various appropriate circuits capable of receiving and playbacking audio data, such as various types of speakers. Each of the first voice receiving circuit 164 and the second voice receiving circuit 17 may be realized with various appropriate circuits capable of receiving sound and converting sound into corresponding audio signals, such as various types of microphones.

In some embodiments, the first member device 120, the first audio playback circuit 162, and the first voice receiving circuit 164 may be integrated into a single device (e.g., a wearable Bluetooth device or a Bluetooth speaker). Similarly, the second member device 130, the second audio playback circuit 172, and the second voice receiving circuit 174 may be integrated into a single device (e.g., a wearable Bluetooth device or a Bluetooth speaker).

The main circuit structure and implementations of other member devices (e.g., the third member device 140), other audio playback circuits (e.g., the third audio playback circuit 182), and other voice receiving circuits (e.g., the third voice receiving circuit 184) in the Bluetooth device set 102, may be similar to the aforementioned corresponding member devices/corresponding circuits. But different additional circuit components may be provided in different member devices, different audio playback circuits, and/or different voice receiving circuits. The circuit structure of all member devices is not required to be exactly identical with each other. The circuit structure of all audio playback circuits is not required to be exactly identical with each other. The circuit structure of all voice receiving circuits are not required to be exactly identical with each other.

When the Bluetooth host device 110 and the member devices in the Bluetooth device set 102 support the BLE Audio technology, the user may utilize the Bluetooth communication system 100 to conduct various audio playback operations adopting the BLE Audio technology to reduce the power consumption of the Bluetooth communication system 100 while improving the overall audio playback quality.

As described previously, when a traditional Bluetooth device set that supports the BLE Audio technology wants to connect with a traditional Bluetooth host device, the traditional Bluetooth host device has to negotiate with individual member devices in the traditional Bluetooth device set one by one regarding the relevant parameters for generating cypher keys. Therefore, it will take a lengthy time for the traditional Bluetooth host device to respectively conduct Bluetooth pairing with respective member devices in the traditional Bluetooth device set.

In order to solve the problem that the efficiency of pairing between the traditional Bluetooth host device and different member devices in the traditional Bluetooth device set is too low, the Bluetooth host device 110 and the Bluetooth device set 102 in the disclosed Bluetooth communication system 100 will adopt different approaches to improve the generation efficiency of related cypher keys.

Figure 2:
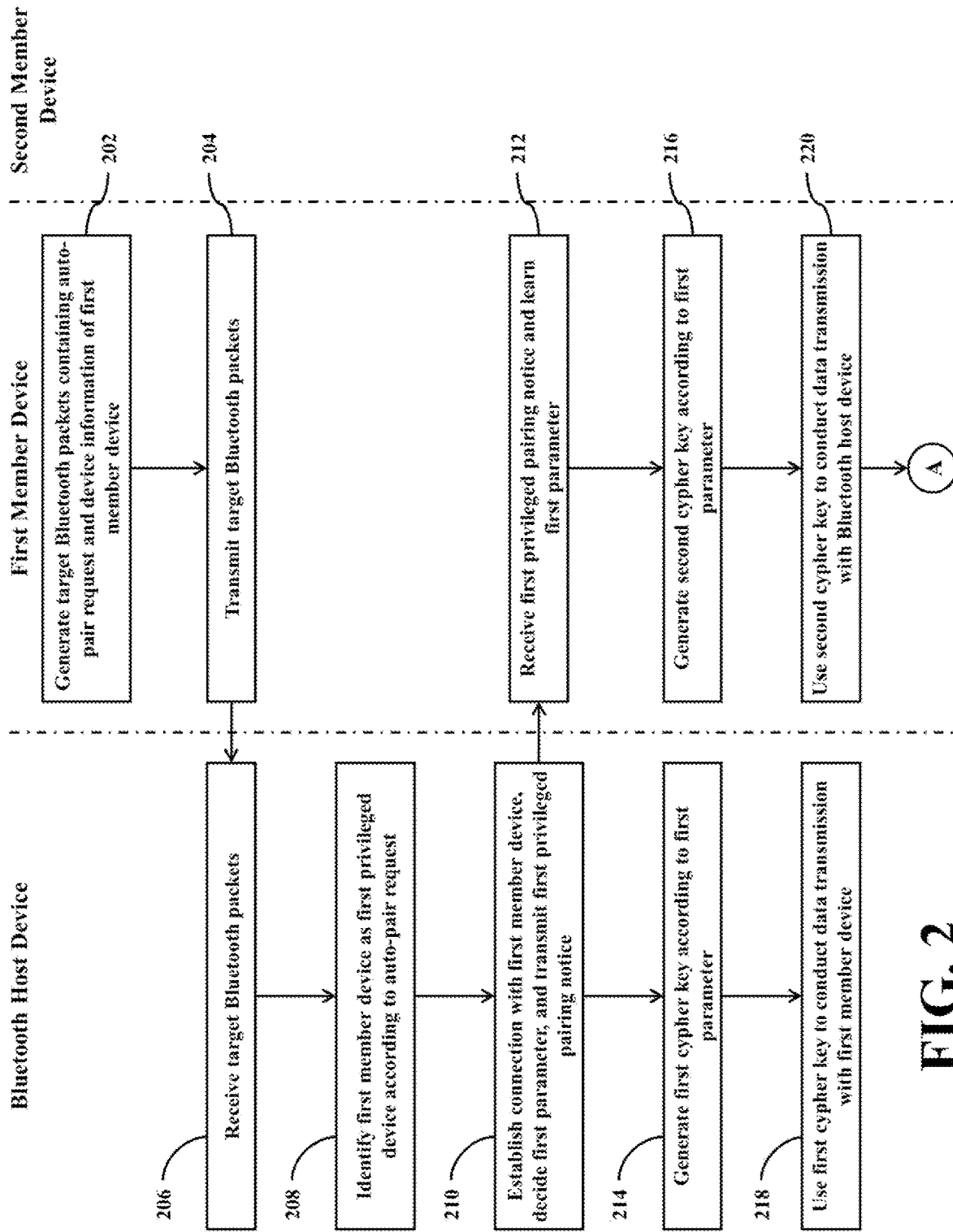
FIG. 2 and FIG. 3 collectively show a simplified flowchart of a method for generating cypher keys required for Bluetooth data transmission according to a first embodiment of the present disclosure.
Figure 3:
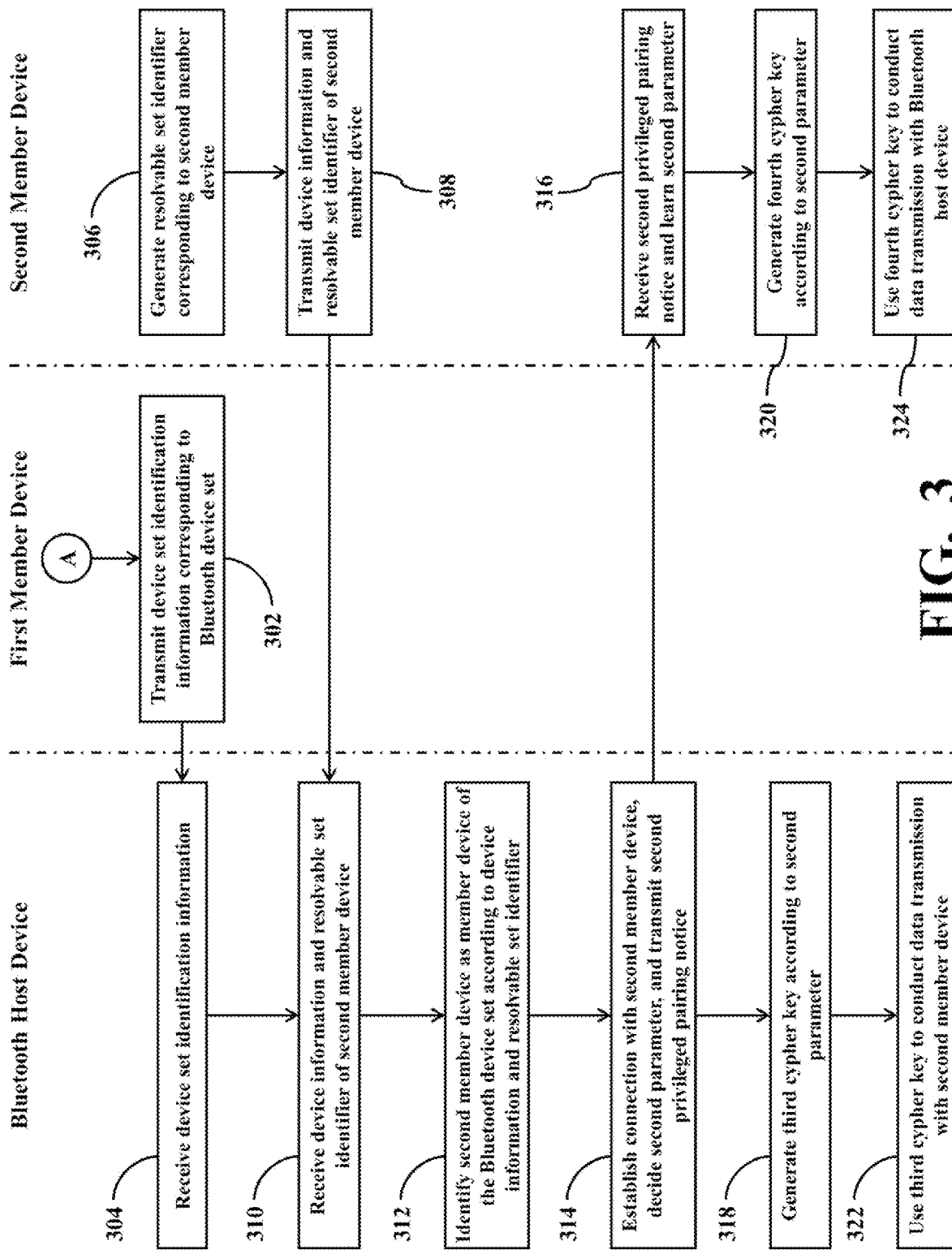

The operations of the Bluetooth communication system 100 will be further described in the following by reference to FIG. 2 and FIG. 3. FIG. 2 and FIG. 3 collectively show a simplified flowchart of a method for generating cypher keys required for Bluetooth data transmission according to a first embodiment of the present disclosure.

In the flowchart of FIG. 2 and FIG. 3, operations within a column under the name of a specific device are operations to be performed by the specific device. For example, operations within a column under the label "Bluetooth host device" are operations to be performed by the Bluetooth host device 110; operations within a column under the label "first member device" are operations to be performed by the first member device 120; operations within a column under the label "second member device" are operations to be performed by the second member device 130; and so forth. The same analogous arrangement also applies to the subsequent flowcharts.

When the user wants to utilize the Bluetooth communication system 100 to playback various audio data adopting the BLE Audio technology, the Bluetooth host device 110 should be paired with respective member devices in the Bluetooth device set 102 in advance.

In this situation, the processing circuit 117 of the Bluetooth host device 110 may generate a Bluetooth inquiry request containing a device information of the Bluetooth host device 110 (e.g., a Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102. In practice, the processing circuit 117 may also fill in other data or messages in the above Bluetooth inquiry request depending on the requirement of the function design.

Alternatively, the processing circuit 117 may control the host-side communication circuit 111 to operate in a predetermined receiving mode at an appropriate time according to the user's manipulation, or based on the default operating instructions of the internal programs. For example, the predetermined receiving mode may be an operating mode capable of receiving various Bluetooth advertising packets, such as an LE Extended Passive Scan mode, an LE Extended Active Scan mode, an LE Extended Initiator mode, or a Periodic Scanning.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110. The predetermined transmitting mode may be various operating modes capable of transmitting various Bluetooth advertising packets and/or Bluetooth protocol data units (PDUs). For example, the predetermined transmitting mode may be an Advertising mode, a Scannable mode, a Connectable mode, a Non-connectable mode, a Non-scannable mode, a Periodic Advertising mode, an LE Extended Advertising mode, or an LE Periodic Advertising mode.

The first member device 120 may perform the operation 202 of FIG. 2 after entering the predetermined transmitting mode.

In the operation 202, the first control circuit 125 may generate one or more target Bluetooth packets, wherein the one or more target Bluetooth packets contain a device information of the first member device 120 (e.g., a Bluetooth device address of the first member device 120) and an auto-pair request that can be utilized to identify the brand, the vendor, the circuit model, and/or the firmware version of the first member device 120 or the first control circuit 125. The first control circuit 125 may define the content and format of the auto-pair request by itself according to preset rules. The first control circuit 125 may insert the auto-pair request and the device information of the first member device 120 into one or more specific fields of a single target Bluetooth packet, or may insert them into specific fields of multiple target Bluetooth packets in a distributed manner. In operations, the first control circuit 125 may utilize predetermined Bluetooth advertising packets to be the above target Bluetooth packets.

For example, the one or more target Bluetooth packets mentioned in the operation 202 may be one or more auxiliary advertising indication (AUX_ADV_IND) packets, or may be a group of packets formed by one or more extended advertising indication (ADV_EXT_IND) packets and one or more auxiliary advertising indication (AUX_ADV_IND) packets.

For another example, the aforementioned one or more target Bluetooth packets may be one or more auxiliary chain indication (AUX_CHAIN_IND) packets, or may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

For another example, the aforementioned one or more target Bluetooth packets may be one or more auxiliary scan response (AUX_SCAN_RSP) packets, or may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets.

For another example, the aforementioned one or more target Bluetooth packets may be a group of packets formed by one or more auxiliary scan response (AUX_SCAN_RSP) packets, and one or more auxiliary chain indication (AUX_CHAIN_IND) packets.

For another example, the aforementioned one or more target Bluetooth packets may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

For another example, the aforementioned one or more target Bluetooth packets may be one or more auxiliary synchronous indication (AUX_SYNC_IND) packets, or may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

For another example, the aforementioned one or more target Bluetooth packets may be one or more advertising indication (ADV_IND) packets, one or more non-connectable advertising indication (ADV_NONCONN_IND) packets, or one or more discoverable advertisement indication (ADV_DISCOVER_IND) packets.

For another example, the aforementioned one or more target Bluetooth packets may be a group of packets formed by one or more advertising indication (ADV_IND) packets, and one or more non-connectable advertising indication (ADV_NONCONN_IND) packets.

For another example, the aforementioned one or more target Bluetooth packets may be a group of packets formed by one or more advertising indication (ADV_IND) packets, and one or more discoverable advertisement indication (ADV_DISCOVER_IND) packets.

For another example, the aforementioned one or more target Bluetooth packets may be a group of packets formed by one or more advertising indication (ADV_IND) packets, one or more non-connectable advertising indication (ADV_NONCONN_IND) packets, and one or more discoverable advertisement indication (ADV_DISCOVER_IND) packets.

In the operation 204, the first control circuit 125 may utilize the first communication circuit 121 to transmit the aforementioned one or more target Bluetooth packets to the Bluetooth host device 110.

In the operation 206, the host-side communication circuit 111 of the Bluetooth host device 110 may receive the one or more target Bluetooth packets.

In the operation 208, the processing circuit 117 of the Bluetooth host device 110 may parse the one or more target Bluetooth packets to acquire the auto-pair request and the device information of the first member device 120 transmitted from the first member device 120. Then, the processing circuit 117 may inspect the format and content of the auto-pair request to determine whether the brand, the vendor, the circuit model, and/or the firmware version of the first member device 120 or the first control circuit 125 matches a predetermined condition (e.g., whether it or they correspond to the brand, the vendor, the circuit model, and/or the firmware version of the Bluetooth host device 110 and/or the processing circuit 117). For example, the processing circuit 117 may inspect whether the format of the auto-pair request matches a predetermined feature or not, or whether the auto-pair request contains a predetermined content or not.

In one embodiment, if the format of the auto-pair request matches the predetermined feature, and/or the auto-pair request contains the predetermined content, then the processing circuit 117 may determine that the brand, the vendor, the circuit model, and/or the firmware version of the first member device 120 or the first control circuit 125 matches the predetermined condition. In this situation, the processing circuit 117 may identify the first member device 120 as a first privileged device according to the aforementioned auto-pair request, and then perform the operation 210.

In this embodiment, when the first member device 120 is identified as a privileged device by the processing circuit 117, it means that when the Bluetooth host device 110 and the first member device 120 conduct a Bluetooth pairing procedure, the Bluetooth host device 110 and the first member device 120 can skip many traditional key parameter negotiation steps, and are permitted to directly adopt a pre-defined simplified method to generate the cypher keys. Relevant operations will be further described in the operation 210 through the operation 216.

On the contrary, if the format of the auto-pair request does not match the predetermined feature, and the auto-pair request does not contain predetermined contents, then the processing circuit 117 may determine that the brand, the vendor, the circuit model, and/or the firmware version of the first member device 120 or the first control circuit 125 does not match the predetermined condition. In this situation, the processing circuit 117 may identify the first member device 120 as an ordinary Bluetooth device, and then adopt various existing approaches to conduct Bluetooth pairing with the first member device 120 so as to generate related cypher keys.

In the operation 210, the processing circuit 117 may establish a connection with the first member device 120 through the host-side communication circuit 111, and may decide a first parameter P1 and generate a first privileged pairing notice. In one embodiment, the processing circuit 117 may generate a first predetermined value, a first random value, a first predetermined address, a first random address, a first predetermined string, a first random string, a first predetermined token, a first random token, or a first access address corresponding to the first member device 120 to be the first parameter P1. In another embodiment, the processing circuit 117 may opt to use the content of a predetermined field in a certain Bluetooth packet transmitted from the first member device 120 to the Bluetooth host device 110 to be the first parameter P1, or may instead opt to use the content of a predetermined field in a certain Bluetooth packet transmitted from the Bluetooth host device 110 to the first member device 120 to be the first parameter P1. For example, the processing circuit 117 may opt to use an initial value of a cyclic redundancy check (CRCInit), a window size (WinSize), a window offset (WinOffset), a connection event interval (Connection Interval), a slave latency, a timeout value, a channel map, a hop, or a sleep clock accuracy (SCA) in a connection indication (Connect_IND) packet or in an auxiliary connection request (AUX_Connect_REQ) packet generated by the processing circuit 117 to be the first parameter P1. For another example, the processing circuit 117 may opt to use the value of the cyclic redundancy check (CRC) in the aforementioned connection indication (Connect_IND) packet or auxiliary connection request (AUX_Connect_REQ) packet to be the first parameter P1. For another example, the processing circuit 117 may opt to use the value of the cyclic redundancy check (CRC) in an auxiliary connection response (AUX_Connect_RSP) packet or in a specific Bluetooth advertising packet generated by the first member device 120 to be the first parameter P1. The processing circuit 117 may also transmit the first privileged pairing notice to the first member device 120 through the host-side communication circuit 111 in the operation 210. Additionally, in the operation 210, the processing circuit 117 may also transmit the first parameter P1 or a first field indication to the first member device 120 through the host-side communication circuit 111, wherein the first field indication is utilized for indicating a specific packet field whose content is to be utilized as the first parameter P1.

In this situation, the first communication circuit 121 of the first member device 120 may perform the operation 212 to receive the first privileged pairing notice transmitted from the Bluetooth host device 110. In addition, the first communication circuit 121 may also receive the first parameter P1 or a related first field indication transmitted from the Bluetooth host device 110 in the operation 212, so that the first control circuit 125 is enabled to learn the first parameter P1 decided by the Bluetooth host device 110 accordingly.

In the operation 214, the processing circuit 117 of the Bluetooth host device 110 may generate a first cypher key Key-1 required for conducting subsequent Bluetooth data transmissions with the first member device 120 according to the first parameter P1. For example, the processing circuit 117 may execute a predetermined cypher key algorithm to generate the first cypher key Key-1 according to the first parameter P1 and the device information of the Bluetooth host device 110. For another example, the processing circuit 117 may execute the aforementioned predetermined cypher key algorithm to generate the first cypher key Key-1 according to the first parameter P1, the device information of the Bluetooth host device 110, and the device information of the first member device 120.

In the operation 216, the first control circuit 125 of the first member device 120 may generate a second cypher key Key-2 required for conducting subsequent Bluetooth data transmissions with the Bluetooth host device 110 according to the first parameter P1. In other words, the second cypher key Key-2 generated by the first control circuit 125 and the first cypher key Key-1 generated by the processing circuit 117 will correspond to each other. For example, the first control circuit 125 may execute the aforementioned predetermined cypher key algorithm to generate the second cypher key Key-2 according to the first parameter P1 and the device information of the first member device 120. For another example, the first control circuit 125 may execute the aforementioned predetermined cypher key algorithm to generate the second cypher key Key-2 according to the first parameter P1, the device information of the first member device 120, and the device information of the Bluetooth host device 110.

In other words, after the first member device 120 is identified as the first privileged device by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. That is, the Bluetooth host device 110 can directly generate the first cypher key Key-1 based on the first parameter P1 decided by the Bluetooth host device 110 while the first member device 120 can directly generate the second cypher key Key-2 based on the first parameter P1 decided by the Bluetooth host device 110. As a result, it can significantly reduce the required time for generating the first cypher key Key-1 and the second cypher key Key-2.

In the operation 218, the processing circuit 117 of the Bluetooth host device 110 may use the first cypher key Key-1 to conduct Bluetooth data transmissions with the first member device 120 through the host-side communication circuit 111.

In the operation 220, the first control circuit 125 of the first member device 120 may use the second cypher key Key-2 to conduct Bluetooth data transmissions with the Bluetooth host device 110 through the first communication circuit 121.

For example, in the embodiments where both the Bluetooth host device 110 and the first member device 120 support the BLE Audio technology, the Bluetooth host device 110 may adopt the BLE Audio technology to transmit audio data to the first member device 120, and the Bluetooth host device 110 can utilize the Low Complexity Communication Codec (LC3) to encode the audio data. As a result, it not only reduces the power consumption of the Bluetooth host device 110 and the first member device 120 to thereby extend the serving time of the Bluetooth host device 110 and the first member device 120, but also effectively improves the overall quality of the audio playback operations.

As shown in FIG. 3, after the second cypher key Key-2 is generated by the first control circuit 125, the first control circuit 125 may further perform the operation 302 to utilize the first communication circuit 121 to transmit a device set identification information Set-ID corresponding to the Bluetooth device set 102. For example, the first control circuit 125 may utilize a Set Identity Resolving Key (SIRK) of the Bluetooth device set 102 to be the device set identification information Set-ID of the Bluetooth device set 102.

In this situation, the host-side communication circuit 111 of the Bluetooth host device 110 may perform the operation 304 to receive the device set identification information Set-ID transmitted from the first member device 120.

In operations, the first control circuit 125 of the first member device 120 may generate a resolvable set identifier (RSI) corresponding to the first member device 120 at an appropriate time point (e.g., at any time point between the operation 202 and the operation 220, or at a certain time point before the operation 202). For example, the first control circuit 125 may perform a predetermined target algorithm according to the device set identification information Set-ID of the Bluetooth device set 102 to generate a random address, and utilize the random address to be a resolvable set identifier RSI-1 corresponding to the first member device 120.

In practice, the first control circuit 125 may utilize the first communication circuit 121 to transmit the resolvable set identifier RSI-1 corresponding to the first member device 120 to the Bluetooth host device 110 at any time point after the operation 202.

Alternatively, the first control circuit 125 may also insert the resolvable set identifier RSI-1 corresponding to the first member device 120 into the one or more target Bluetooth packets to be transmitted to the Bluetooth host device 110 in the operation 202. As a result, the Bluetooth host device 110 is enabled to receive the resolvable set identifier RSI-1 corresponding to the first member device 120 in the operation 206.

Similarly, the second control circuit 135 of the second member device 130 may perform the operation 306 of FIG. 3 at any appropriate time point to generate a resolvable set identifier RSI-2 corresponding to the second member device 130. For example, the second control circuit 135 may perform the aforementioned target algorithm according to the device set identification information Set-ID of the Bluetooth device set 102 to generate a random address, and utilize the random address to be the resolvable set identifier RSI-2 corresponding to the second member device 130. In practice, the second control circuit 135 may perform the operation 306 at any time point between the operation 202 and the operation 220, or at a certain time point before the operation 202.

As described previously, all member devices in the Bluetooth device set 102 may operate in a predetermined transmitting mode. The second member device 130 may perform the operation 308 of FIG. 3 during a time period while the second member device 130 operates in the predetermined transmitting mode.

In the operation 308, the second control circuit 135 may utilize the second communication circuit 131 to transmit a device information of the second member device 130 (e.g., a Bluetooth device address of the second member device 130) and the resolvable set identifier RSI-2 to the Bluetooth host device 110. In operations, the second control circuit 135 may generate one or more target Bluetooth packets containing the device information of the second member device 130 and the resolvable set identifier RSI-2 by adopting the approach described in the aforementioned operation 202. For example, the second control circuit 135 may insert the resolvable set identifier RSI-2 and the device information of the second member device 130 into one or more specific fields of a single target Bluetooth packet, or may insert them into specific fields of multiple target Bluetooth packets in a distributed manner. Then, the second control circuit 135 may utilize the second communication circuit 131 to transmit the one or more target Bluetooth packets to the Bluetooth host device 110.

The type of the target Bluetooth packets referred to in the operation 308 may be the same as the type of the target Bluetooth packets referred to in the aforementioned operation 202. For the sake of brevity, the descriptions will not be repeated here.

In this situation, the host-side communication circuit 111 of the Bluetooth host device 110 may perform the operation 310 to receive the one or more target Bluetooth packets transmitted from the second member device 130. The processing circuit 117 may parse the one or more target Bluetooth packets to acquire the device information of the second member device 130 and the resolvable set identifier RSI-2.

Then, in the operation 312, the processing circuit 117 may inspect the resolvable set identifier RSI-2 of the second member device 130 according to the device set identification information Set-ID transmitted from the first member device 120, so as to determine whether the second member device 130 belongs to the Bluetooth device set 102 or not. For example, in this embodiment, the processing circuit 117 may inspect whether the resolvable set identifier RSI-2 is a random address calculated based on the device set identification information Set-ID or not.

If the processing circuit 117 determines that the resolvable set identifier RSI-2 is a random address generated based on the device set identification information Set-ID, then the processing circuit 117 may determine that the second member device 130 belongs to the Bluetooth device set 102. In this situation, the processing circuit 117 may identify the second member device 130 as a member device of the Bluetooth device set 102 in the operation 312 according to the device set identification information Set-ID and the resolvable set identifier RSI-2, and then perform the operation 314.

In this embodiment, when the second member device 130 is identified as a member device of the Bluetooth device set 102 by the processing circuit 117, it means that when the Bluetooth host device 110 and the second member device 130 conduct a Bluetooth pairing procedure, the Bluetooth host device 110 and the second member device 130 can skip many traditional key parameter negotiation steps, and are permitted to directly adopt a pre-defined simplified method to generate the cypher keys. Relevant operations will be further described in the operation 314 through the operation 320.

On the contrary, if the processing circuit 117 determines that the resolvable set identifier RSI-2 is not a random address generated based on the device set identification information Set-ID, then the processing circuit 117 may determine that the second member device 130 does not belong to the Bluetooth device set 102. In this situation, the processing circuit 117 may identify the second member device 130 as an ordinary Bluetooth device, and then adopt various existing approaches to conduct Bluetooth pairing with the second member device 130 so as to generate related cypher keys.

In the operation 314, the processing circuit 117 may establish a connection with the second member device 130 through the host-side communication circuit 111, and may decide a second parameter P2 and generate a second privileged pairing notice. In one embodiment, the processing circuit 117 may generate a second predetermined value, a second random value, a second predetermined address, a second random address, a second predetermined string, a second random string, a second predetermined token, a second random token, or a second access address corresponding to the second member device 130 to be the second parameter P2. In another embodiment, the processing circuit 117 may opt to use the content of a predetermined field in a certain Bluetooth packet transmitted from the second member device 130 to the Bluetooth host device 110 to be the second parameter P2, or may instead opt to use the content of a predetermined field in a certain Bluetooth packet transmitted from the Bluetooth host device 110 to the second member device 130 to be the second parameter P2. For example, the processing circuit 117 may opt to use an initial value of a cyclic redundancy check (CRCInit), a window size (WinSize), a window offset (WinOffset), a connection event interval (Connection Interval), a slave latency, a timeout value, a channel map, a hop, or a sleep clock accuracy (SCA) in a connection indication (Connect_IND) packet or in an auxiliary connection request (AUX_Connect_REQ) packet generated by the processing circuit 117 to be the second parameter P2. For another example, the processing circuit 117 may opt to use the value of the cyclic redundancy check (CRC) in the aforementioned connection indication (Connect_IND) packet or auxiliary connection request (AUX_Connect_REQ) packet to be the second parameter P2. For another example, the processing circuit 117 may opt to use the value of the cyclic redundancy check (CRC) in an auxiliary connection response (AUX_Connect_RSP) packet or in a specific Bluetooth advertising packet generated by the second member device 130 to be the second parameter P2. The processing circuit 117 may also transmit the second privileged pairing notice to the second member device 130 through the host-side communication circuit 111 in the operation 314. Additionally, in the operation 314, the processing circuit 117 may also transmit the second parameter P2 or a second field indication to the second member device 130 through the host-side communication circuit 111, wherein the second field indication is utilized for indicating a specific packet field whose content is to be utilized as the second parameter P2. In practice, the second parameter P2 may be identical to the first parameter P1, or may be different from the first parameter P1.

In this situation, the second communication circuit 131 of the second member device 130 may perform the operation 316 to receive the second privileged pairing notice transmitted from the Bluetooth host device 110. In addition, the second communication circuit 131 may also receive the second parameter P2 or a related second field indication transmitted from the Bluetooth host device 110 in the operation 316, so that the second control circuit 135 is enabled to learn the second parameter P2 decided by the Bluetooth host device 110 accordingly.

In the operation 318, the processing circuit 117 of the Bluetooth host device 110 may generate a third cypher key Key-3 required for conducting subsequent Bluetooth data transmissions with the second member device 130 according to the second parameter P2. For example, the processing circuit 117 may execute a predetermined cypher key algorithm according to the second parameter P2 and the device information of the Bluetooth host device 110 to generate the third cypher key Key-3. For another example, the processing circuit 117 may execute the aforementioned predetermined cypher key algorithm according to the second parameter P2, the device information of the second member device 130, and the device information of the Bluetooth host device 110 to generate the third cypher key Key-3.

In the operation 320, the second control circuit 135 of the second member device 130 may generate a fourth cypher key Key-4 required for conducting subsequent Bluetooth data transmissions with the Bluetooth host device 110 according to the second parameter P2. In other words, the fourth cypher key Key-4 generated by the second control circuit 135 and the third cypher key Key-3 generated by the processing circuit 117 will correspond to each other. For example, the second control circuit 135 may generate the aforementioned predetermined cypher key algorithm according to the second parameter P2 and the device information of the second member device 130 to generate the fourth cypher key Key-4. For another example, the second control circuit 135 may execute the aforementioned predetermined cypher key algorithm according to the second parameter P2, the device information of the second member device 130, and the device information of the Bluetooth host device 110 to generate the fourth cypher key Key-4.

In other words, after the second member device 130 is identified as a member device of the Bluetooth device set 102 by the Bluetooth host device 110, the Bluetooth host device 110 and the second member device 130 may omit many traditional key parameter negotiation steps, and instead adopt a highly simplified approach to generate the corresponding third cypher key Key-3 and fourth cypher key Key-4. That is, the Bluetooth host device 110 can directly generate the third cypher key Key-3 based on the second parameter P2 decided by the Bluetooth host device 110 while the second member device 130 can directly generate the fourth cypher key Key-4 based on the second parameter P2 decided by the Bluetooth host device 110. As a result, it can significantly reduce the required time for generating the third cypher key Key-3 and the fourth cypher key Key-4.

In the operation 322, the processing circuit 117 of the Bluetooth host device 110 may use the third cypher key Key-3 to conduct Bluetooth data transmissions with the second member device 130 through the host-side communication circuit 111.

In the operation 324, the second control circuit 135 of the second member device 130 may use the fourth cypher key Key-4 to conduct Bluetooth data transmissions with the Bluetooth host device 110 through the second communication circuit 131.

In practice, the Bluetooth host device 110 and other member devices in the Bluetooth device set 102 (e.g., the third member device 140) may establish connections according to the aforementioned interaction between the Bluetooth host device 110 and the second member device 130 to respectively generate required cypher keys for conducting subsequent Bluetooth data transmissions between both parties.

In the embodiments where both the Bluetooth host device 110 and the second member device 130 support the BLE Audio technology, the Bluetooth host device 110 may adopt the BLE Audio technology to transmit audio data to the second member device 130, and the Bluetooth host device 110 can utilize the Low Complexity Communication Codec (LC3) to encode the audio data. As a result, it not only reduces the power consumption of the Bluetooth host device 110 and the second member device 130 to thereby extend the serving time of the Bluetooth host device 110 and the second member device 130, but also effectively improves the overall quality of the audio playback operations.

In another embodiment, each of the other member devices in the Bluetooth device set 102 (e.g., the second member device 130 and the third member device 140) may generate one or more target Bluetooth packets containing the aforementioned auto-pair request, the device information of respective member device, and the resolvable set identifiers corresponding to respective member device, and transmit the one or more target Bluetooth packets to the to the Bluetooth host device 110 according to the approach adopted by the first member device 120 in the operation 202. In other words, all member devices in the Bluetooth device set 102 may conduct the same operations in the operation 202.

In this situation, the Bluetooth host device 110 may identify a member device that transmits the auto-pair request first as the first privileged device, and then conduct the simplified pairing procedure with the first privileged device first. Afterwards, the Bluetooth host device 110 may identify other member devices as member devices of the Bluetooth device set 102 according to the device set identification information Set-ID transmitted from the first privileged device and the resolvable set identifiers transmitted from other member devices, and then conduct the simplified pairing procedure with other member devices.

It can be appreciated from the foregoing descriptions of FIG. 2 though FIG. 3 that the Bluetooth host device 110 is enabled to determine whether the first member device 120 is a privileged device or not according to the auto-pair request transmitted from the first member device 120. After the first member device 120 is identified as a privileged device by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. That is, the Bluetooth host device 110 is enabled to generate the first cypher key Key-1 by simply performing the aforementioned operation 210 and operation 214 while the first member device 120 is enabled to generate the second cypher key Key-2 by simply performing the aforementioned operation 212 and operation 216. As a result, it can significantly reduce the required time for generating the first cypher key Key-1 and the second cypher key Key-2.

On the other hand, after the second member device 130 is identified as a member device of the Bluetooth device set 102 by the Bluetooth host device 110, the Bluetooth host device 110 and the second member device 130 may omit many traditional key parameter negotiation steps, and instead adopt a highly simplified approach to generate the corresponding third cypher key Key-3 and fourth cypher key Key-4. That is, the Bluetooth host device 110 is enabled to generate the third cypher key Key-3 by simply performing the aforementioned operation 210 and operation 214 while the second member device 130 is enabled to generate the fourth cypher key Key-4 by simply performing the aforementioned operation 212 and operation 216. As a result, it can significantly reduce the required time for generating the third cypher key Key-3 and the fourth cypher key Key-4.

Apparently, the method of above FIG. 2 through FIG. 3 can effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

According to the method described in FIG. 2 through FIG. 3, the Bluetooth host device 110 and respective member devices of the Bluetooth device set 102 does not need to use any display device. Therefore, the display device 150 may be omitted, and the hardware structure, the weight, and the volume of respective member devices of the Bluetooth device set 102 can be greatly simplified.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 4:
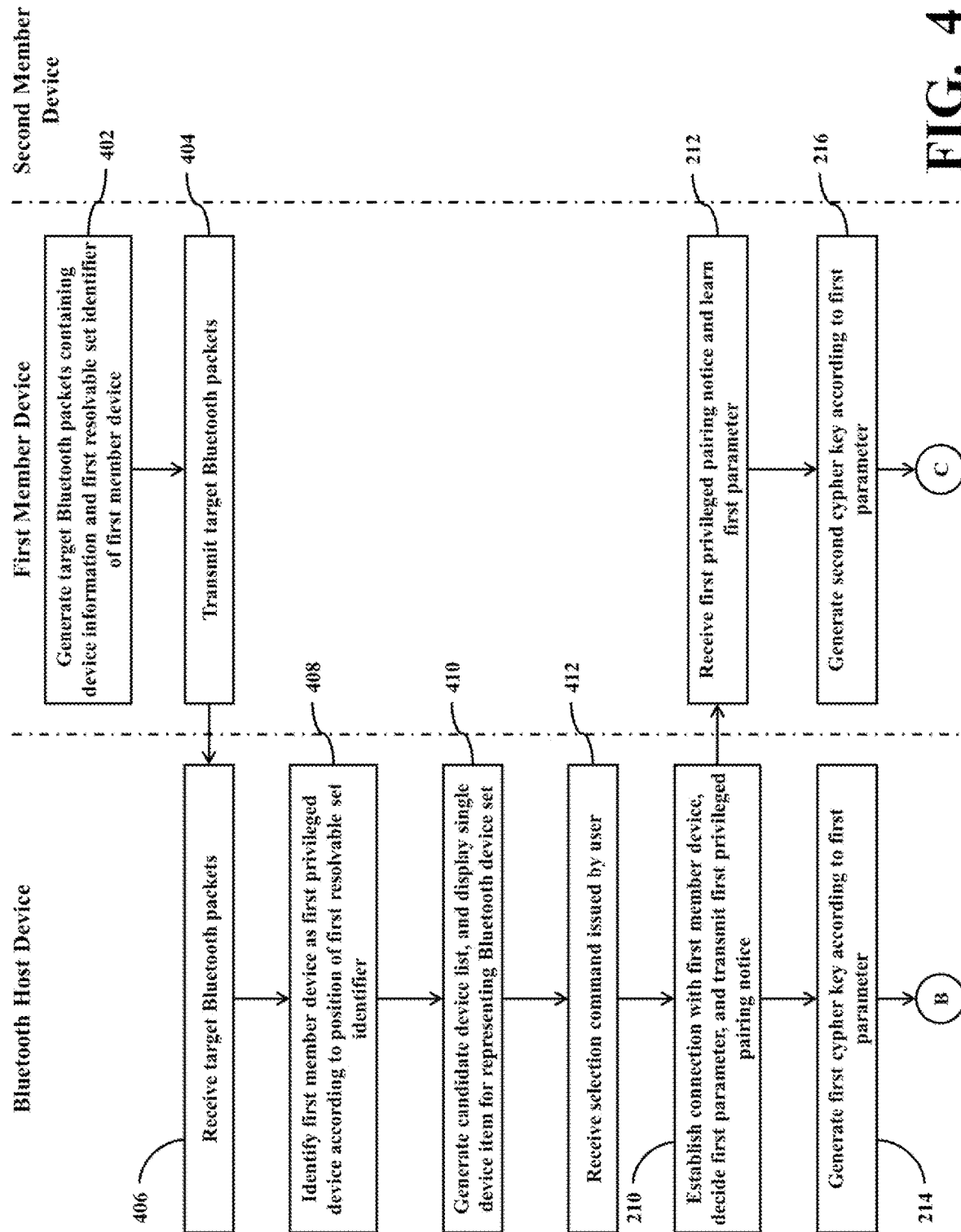
FIG. 4 and FIG. 5 collectively show a simplified flowchart of a method for generating cypher keys required for Bluetooth data transmission according to a second embodiment of the present disclosure.
Figure 5:
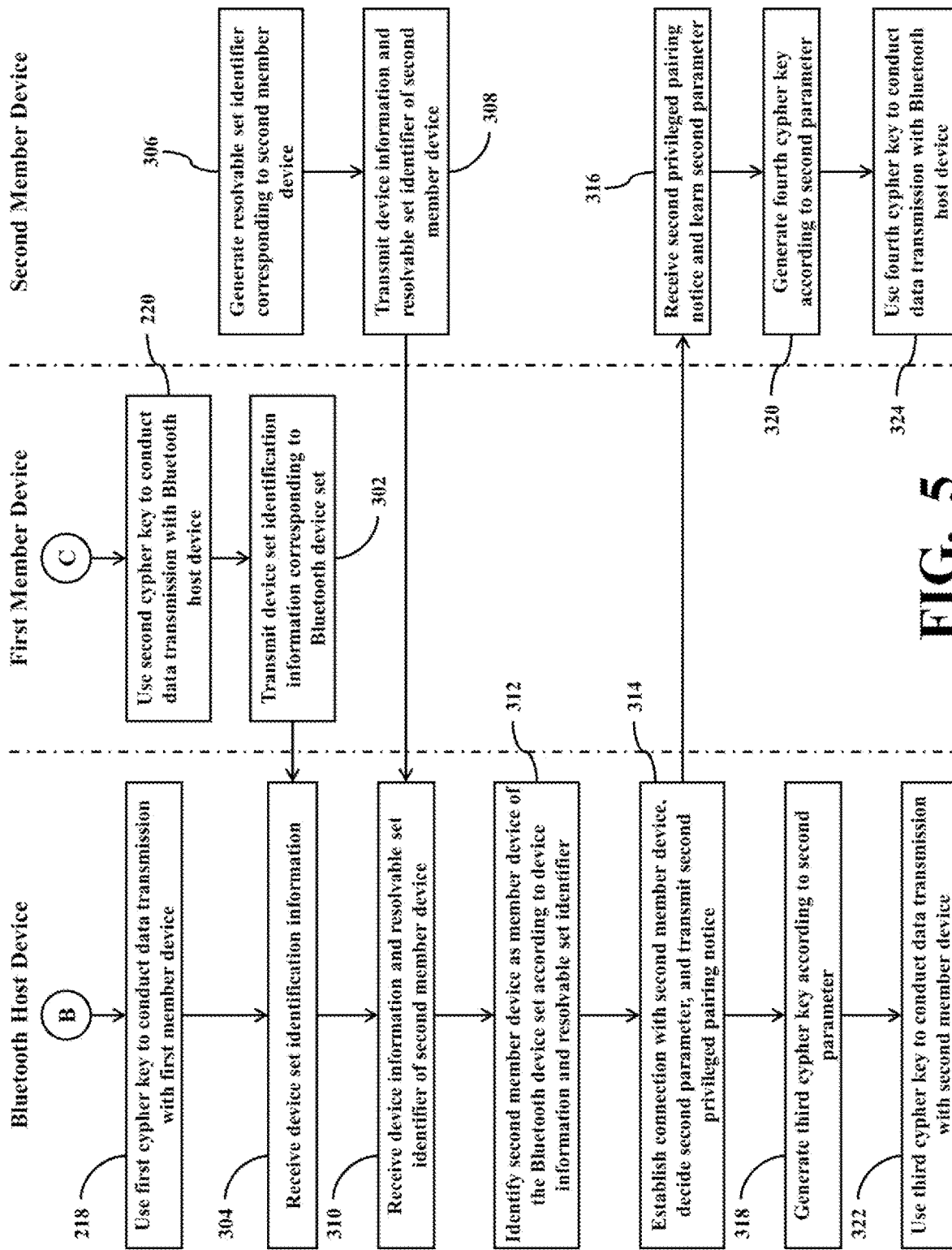

Please refer to FIG. 4 and FIG. 5, which collectively show a simplified flowchart of a method for generating cypher keys required for Bluetooth data transmission according to a second embodiment of the present disclosure.

As described previously, when the user wants to utilize the Bluetooth device set 102 to playback audio data transmitted from the Bluetooth host device 110 by adopting the BLE Audio technology, the Bluetooth host device 110 should be paired with respective member devices in the Bluetooth device set 102 in advance. In this situation, as described above, the processing circuit 117 may generate a Bluetooth inquiry request containing the device information of the Bluetooth host device 110 (e.g., a Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102.

Alternatively, the processing circuit 117 may control the host-side communication circuit 111 to operate in the aforementioned predetermined receiving mode at an appropriate time according to the user's manipulation, or based on the default operating instructions of the internal programs.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

The first member device 120 may perform the operation 402 of FIG. 4 after entering the predetermined transmitting mode.

In the operation 402, the first control circuit 125 may generate one or more target Bluetooth packets, wherein the one or more target Bluetooth packets containing a resolvable set identifier RSI-1 corresponding to the first member device 120, and a device information of the first member device 120 (e.g., a Bluetooth device address of the first member device 120). In operations, the first control circuit 125 of the first member device 120 may generate a resolvable set identifier RSI-1 corresponding to the first member device 120 in the operation 402 or at a certain time point before the operation 402. For example, the first control circuit 125 may perform a predetermined target algorithm according to the device set identification information Set-ID of the Bluetooth device set 102 to generate a random address, and utilize the random address as a resolvable set identifier RSI-1 corresponding to the first member device 120. The first control circuit 125 may insert the resolvable set identifier RSI-1 and the device information of the first member device 120 into one or more specific fields of a single target Bluetooth packet, or may insert them into specific fields of multiple target Bluetooth packets in a distributed manner.

In practice, the first control circuit 125 may also insert the device set identification information Set-ID of the Bluetooth device set 102, and/or the device information of other member devices in the Bluetooth device set 102 (e.g., the second member device 130 or the third member device 140) into the aforementioned one or more target Bluetooth packets.

The type of the target Bluetooth packets referred to in the operation 402 may be the same as the type of the target Bluetooth packets referred to in the aforementioned operation 202. For the sake of brevity, the descriptions will not be repeated here.

In some embodiments, each of the other member devices in the Bluetooth device set 102 (e.g., the second member device 130 and the third member device 140) may generate one or more target Bluetooth packets containing the device information of respective member device and the resolvable set identifiers corresponding to respective member device, and transmit the one or more target Bluetooth packets to the to the Bluetooth host device 110 according to the approach adopted by the first member device 120 in the operation 402. Similarly, each of the other member devices in the Bluetooth device set 102 (e.g., the second member device 130 and the third member device 140) may also insert the device set identification information Set-ID of the Bluetooth device set 102, and/or the device information of other member devices of the Bluetooth device set 102 into the one or more target Bluetooth packets to be transmitted to the Bluetooth host device 110.

In other words, all member devices in the Bluetooth device set 102 may conduct the same operations in the operation 402.

In the operation 404, the first control circuit 125 may utilize the first communication circuit 121 to transmit the aforementioned one or more target Bluetooth packets to the Bluetooth host device 110.

In the operation 406, the host-side communication circuit 111 of the Bluetooth host device 110 may receive the one or more target Bluetooth packets.

In the operation 408, the processing circuit 117 of the Bluetooth host device 110 may parse the one or more target Bluetooth packets to acquire the resolvable set identifier RSI-1 and the device information of the first member device 120 transmitted from the first member device 120. Then, the processing circuit 117 may inspect the position of the resolvable set identifier RSI-1 in the one or more target Bluetooth packets, to determine whether the brand, the vendor, the circuit model, and/or the firmware version of the first member device 120 or the first control circuit 125 matches a predetermined condition (e.g., whether it or they correspond to the brand, the vendor, the circuit model, and/or the firmware version of the Bluetooth host device 110 and/or the processing circuit 117). For example, the processing circuit 117 may inspect whether the position of the resolvable set identifier RSI-1 in the one or more target Bluetooth packets matches a predetermined rule or not.

In one embodiment, if the position of the resolvable set identifier RSI-1 in the one or more target Bluetooth packets matches the predetermined rule, then the processing circuit 117 may determine that the brand, the vendor, the circuit model, and/or the firmware version of the first member device 120 or the first control circuit 125 matches the predetermined condition. In this situation, the processing circuit 117 may identify the first member device 120 as a first privileged device according to the position of the resolvable set identifier RSI-1, and then perform the operation 410 of FIG. 4.

In this embodiment, when the first member device 120 is identified as a privileged device by the processing circuit 117, it means that when the Bluetooth host device 110 and the first member device 120 conduct a Bluetooth pairing procedure, the Bluetooth host device 110 and the first member device 120 can skip many traditional key parameter negotiation steps, and my directly adopt a pre-defined simplified method to generate the cypher keys. The operations of this portion are substantially the same as that in the operation 210 through the operation 216 described previously.

On the contrary, if the position of the resolvable set identifier RSI-1 in the one or more target Bluetooth packets does not match the predetermined rule, then the processing circuit 117 may determine that the brand, the vendor, the circuit model, and/or the firmware version of the first member device 120 or the first control circuit 125 does not match the predetermined condition. In this situation, the processing circuit 117 may identify the first member device 120 as an ordinary Bluetooth device, and then adopt various existing approaches to conduct Bluetooth pairing with the first member device 120 so as to generate related cypher keys.

In the operation 410, the processing circuit 117 may generate a corresponding candidate device list according to messages transmitted from multiple nearby Bluetooth devices (e.g., responses to the Bluetooth inquiry request sent by the Bluetooth host device 110), and control the display device 150 to display the candidate device list. The processing circuit 117 may also conduct filtering on the device items to be displayed in the candidate device list in the operation 410, and control the display device 150 to display a single device item for representing the entire Bluetooth device set 102 in the candidate device list, but does not simultaneously display a plurality of device items for respectively representing a plurality of member devices of the Bluetooth device set 102 in the candidate device list, so as to simplify the complexity of the user's manipulations during the Bluetooth pairing procedure.

As described previously, all member devices in the Bluetooth device set 102 may conduct the same operations in the operation 402, that is, transmitting one or more target Bluetooth packets containing the device set identification information Set-ID of the Bluetooth device set 102, their own device information, their own resolvable set identifier, and the device information of other member devices the to the Bluetooth host device 110. In the aforementioned operation 410, the processing circuit 117 may determine which member devices belong to the Bluetooth device set 102 just like the first member device 120 according to the contents of the target Bluetooth packets transmitted from different member devices.

For example, the processing circuit 117 may inspect the resolvable set identifier RSI-2 provided by the second member device 130 according to the device set identification information Set-ID transmitted from the first member device 120 to determine whether the second member device 130 belongs to the Bluetooth device set 102 or not. In this embodiment, the processing circuit 117 may inspect whether the resolvable set identifier RSI-2 is a random address generated based on the device set identification information Set-ID. If the processing circuit 117 determines that the resolvable set identifier RSI-2 is a random address generated based on the device set identification information Set-ID, then the processing circuit 117 may determine that both the first member device 120 and the second member device 130 belong to the Bluetooth device set 102.

For another example, the processing circuit 117 may compare the device information of the second member device 130 provided by the first member device 120 with the device information of the second member device 130 provided by the second member device 130 itself, so as to determine whether the second member device 130 belongs to the Bluetooth device set 102 or not. In this embodiment, if the device information of the second member device 130 provided by the first member device 120 is identical to the device information of the second member device 130 provided by the second member device 130 itself, then the processing circuit 117 may determine that both the first member device 120 and the second member device 130 belong to the Bluetooth device set 102.

The user can know which Bluetooth devices can be paired with the Bluetooth host device 110 from the candidate device list displayed on the display device 150. If the processing circuit 117 does not conduct filtering on the device items to be displayed in the candidate device list in the operation 410, multiple device items respectively representing multiple member devices of the Bluetooth device set 102 may be shown in the candidate device list. Such a Bluetooth pairing method is likely to be too complicated (because the user has to select multiple member devices to be paired with the Bluetooth host device 110 one by one), and even makes it difficult for the user to find the correct pairing object.

From another aspect, the operation of filtering device items to be shown in the candidate device list conducted by the processing circuit 117 in the aforementioned operation 410 can simplify the complexity of user's manipulation during the Bluetooth pairing procedure, and can reduce the possibility of user's erroneous manipulation.

The user may manipulate the input circuit 113 to select the Bluetooth device set 102 as the object to be paired with the Bluetooth host device 110.

In this situation, the input circuit 113 may perform the operation 412 to receive a selection command issued by the user, and transmit the selection command to the processing circuit 117.

Then, the operations of the Bluetooth host device 110 in the following operation 210 and operation 214 of FIG. 4 are the same as in the corresponding operations in FIG. 2, while the operations of the first member device 120 in the following operation 212 and operation 216 of FIG. 4 are the same as the in corresponding operations in FIG. 2. For the sake of brevity, the descriptions will not be repeated here.

In other words, after the first member device 120 is identified as the first privileged device by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. That is, the Bluetooth host device 110 is enabled to generate the first cypher key Key-1 by simply performing the aforementioned operation 210 and operation 214 while the first member device 120 is enabled to generate the second cypher key Key-2 by simply performing the aforementioned operation 212 and operation 216. As a result, it can significantly reduce the required time for generating the first cypher key Key-1 and the second cypher key Key-2.

As shown in FIG. 5, the Bluetooth host device 110 may perform the operation 218 of FIG. 5 and subsequent operations after generating the first cypher key Key-1, and the first member device 120 may perform the operation 220 of FIG. 5 and subsequent operations after generating the second cypher key Key-2.

Similarly, the second control circuit 135 of the second member device 130 may perform the operation 306 of FIG.

5 at an appropriate time to generate a resolvable set identifier RSI-2 corresponding to the second member device 130. For example, the second control circuit 135 may perform the aforementioned target algorithm according to the device set identification information Set-ID of the Bluetooth device set 102 to generate a random address, and utilize the random address to be the resolvable set identifier RSI-2 corresponding to the second member device 130. In practice, the second control circuit 135 may perform the operation 306 of FIG. 5 at any time point between the operation 402 of FIG. 4 through the operation 220 of FIG. 5, or at a certain time point before the operation 402 of FIG. 4.

The operations of the Bluetooth communication system 100 in respective operations of FIG. 5 are the same as the in corresponding operations of the aforementioned FIG. 2 and FIG. 3. For the sake of brevity, the descriptions will not be repeated here.

In other words, in the embodiment of FIG. 5, after the second member device 130 is identified as a member device of the Bluetooth device set 102 by the Bluetooth host device 110, the Bluetooth host device 110 and the second member device 130 may omit many traditional key parameter negotiation steps, and instead adopt a highly simplified approach to generate the corresponding third cypher key Key-3 and fourth cypher key Key-4. That is, the Bluetooth host device 110 is enabled to generate the third cypher key Key-3 by simply performing the aforementioned operation 210 and operation 214 while the second member device 130 is enabled to generate the fourth cypher key Key-4 by simply performing the aforementioned operation 212 and operation 216. As a result, it can significantly reduce the required time for generating the third cypher key Key-3 and the fourth cypher key Key-4.

In practice, the Bluetooth host device 110 and other member devices in the Bluetooth device set 102 (e.g., the third member device 140) may establish connections according to the aforementioned interaction between the Bluetooth host device 110 and the second member device 130 to respectively generate required cypher keys for conducting subsequent Bluetooth data transmissions between both parties.

Similarly, in the embodiments where the Bluetooth host device 110, the first member device 120, and the second member device 130 support the BLE Audio technology, the Bluetooth host device 110 may adopt the BLE Audio technology to transmit audio data to the first member device 120 and the second member device 130, and the Bluetooth host device 110 can utilize the Low Complexity Communication Codec (LC3) to encode the audio data. As a result, it not only reduces the power consumption of the Bluetooth host device 110, the first member device 120, and the second member device 130 to thereby extend the serving time of the Bluetooth host device 110, the first member device 120, and the second member device 130, but also effectively improves the overall quality of the audio playback operations.

In another embodiment, other member devices in the Bluetooth device set 102 (e.g., the second member device 130 and the third member device 140) may generate one or more target Bluetooth packets containing the device information of respective member device and the resolvable set identifiers corresponding to respective member device, and transmit the one or more target Bluetooth packets to the to the Bluetooth host device 110 according to the approach adopted by the first member device 120 in the operation 402 of FIG. 4. In other words, all member devices in the Bluetooth device set 102 may conduct the same operations in the operation 402.

In this situation, the Bluetooth host device 110 may identify a member device that transmits the auto-pair request first as the first privileged device, and then conduct the simplified pairing procedure with the first privileged device first. Afterwards, the Bluetooth host device 110 may identify other member devices as member devices of the Bluetooth device set 102 according to the device set identification information Set-ID transmitted from the first privileged device and the resolvable set identifiers transmitted from other member devices, and then conduct the simplified pairing procedure with other member devices.

It can be appreciated from the foregoing descriptions of FIG. 2 though FIG. 3 that the Bluetooth host device 110 is enabled to determine whether the first member device 120 is a privileged device or not according to the position of the resolvable set identifier RSI-1 in the one or more target Bluetooth packets transmitted from the first member device 120. After the first member device 120 is identified as a privileged device by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. That is, the Bluetooth host device 110 is enabled to generate the first cypher key Key-1 by simply performing the aforementioned operation 210 and operation 214 while the first member device 120 is enabled to generate the second cypher key Key-2 by simply performing the aforementioned operation 212 and operation 216. As a result, it can significantly reduce the required time for generating the first cypher key Key-1 and the second cypher key Key-2.

On the other hand, after the second member device 130 is identified as a member device of the Bluetooth device set 102 by the Bluetooth host device 110, the Bluetooth host device 110 and the second member device 130 may omit many traditional key parameter negotiation steps, and instead adopt a highly simplified approach to generate the corresponding third cypher key Key-3 and fourth cypher key Key-4. That is, the Bluetooth host device 110 is enabled to generate the third cypher key Key-3 by simply performing the aforementioned operation 210 and operation 214 while the second member device 130 is enabled to generate the fourth cypher key Key-4 by simply performing the aforementioned operation 212 and operation 216. As a result, it can significantly reduce the required time for generating the third cypher key Key-3 and the fourth cypher key Key-4.

Apparently, the method of above FIG. 4 through FIG. 5 can also effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

Furthermore, the operation of filtering device items to be shown in the candidate device list conducted by the processing circuit 117 in the aforementioned operation 410 can simplify the complexity of user's manipulation during the Bluetooth pairing procedure, and also reduce the possibility of user's erroneous manipulation.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 6:
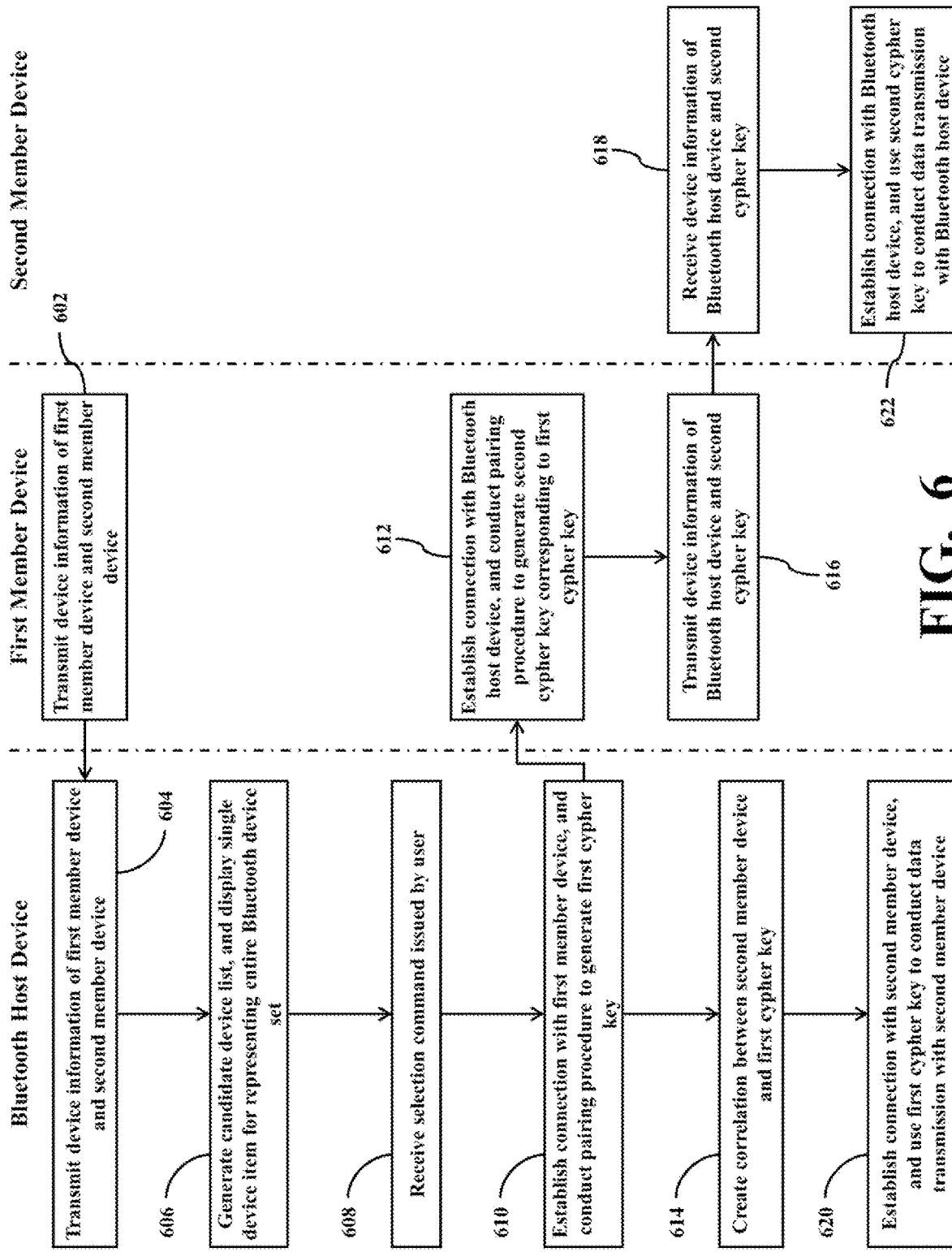
FIG. 6 shows a simplified flowchart of a method for generating cypher keys required for Bluetooth data transmission according to a third embodiment of the present disclosure.

Please refer to FIG. 6, which shows a simplified flowchart of a method for generating cypher keys required for Bluetooth data transmission according to a third embodiment of the present disclosure.

As described previously, when the Bluetooth host device 110 wants to conduct pairing with respective member devices of the Bluetooth device set 102, the processing circuit 117 may generate a Bluetooth inquiry request containing the device information of the Bluetooth host device 110 (e.g., a Bluetooth device address of the Bluetooth host device 110), and may utilize the host-side communication circuit 111 to transmit the Bluetooth inquiry request to other nearby Bluetooth devices.

Alternatively, the processing circuit 117 may control the host-side communication circuit 111 to operate in the aforementioned predetermined receiving mode.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

The first member device 120 may perform the operation 602 of FIG. 6 after entering the predetermined transmitting mode.

In the operation 602, the first control circuit 125 may utilize the first communication circuit 121 to transmit a device information of the first member device 120 (e.g., a Bluetooth device address of the first member device 120), and a device information of the second member device 130 (e.g., a Bluetooth device address of the second member device 130) to the Bluetooth host device 110. For example, the first control circuit 125 may generate one or more target Bluetooth packets containing the device information of the first member device 120, and the device information of the second member device 130, and utilize the first communication circuit 121 to transmit the one or more target Bluetooth packets to the Bluetooth host device 110.

The type of the target Bluetooth packets referred to in the operation 602 may be the same as the type of the target Bluetooth packets referred to in the aforementioned operation 202. For the sake of brevity, the descriptions will not be repeated here.

In the operation 604, the host-side communication circuit 111 of the Bluetooth host device 110 may receive the device information of the first member device 120 and the device information of the second member device 130 transmitted from the first member device 120.

In practice, other member devices in the Bluetooth device set 102 (e.g., the second member device 130 and the third member device 140) may transmit their own device information and the device information of other member devices to the Bluetooth host device 110 according to the approach adopted by the first member device 120 in the operation 602.

In other words, all member devices in the Bluetooth device set 102 may conduct the same operations in the operation 602. In this situation, the host-side communication circuit 111 may receive the device information of multiple member devices transmitted from different member devices in the operation 604.

In the operation 606, the processing circuit 117 may generate a corresponding candidate device list according to messages transmitted from multiple nearby Bluetooth devices (e.g., responses to the Bluetooth inquiry request sent by the Bluetooth host device 110), and control the display device 150 to display the candidate device list. The processing circuit 117 may also filter the device items to be displayed in the candidate device list in the operation 606, and control the display device 150 to display a single device item for representing the entire Bluetooth device set 102 in the candidate device list, but does not simultaneously display a plurality of device items for respectively representing a plurality of member devices of the Bluetooth device set 102 in the candidate device list, so as to simplify the complexity of the user's manipulations during the Bluetooth pairing procedure.

As described previously, all member devices in the Bluetooth device set 102 may conduct the same operations in the operation 602, that is, transmitting their own device information and the device information of other member devices to the Bluetooth host device 110. The processing circuit 117 may determine which member devices belong to the Bluetooth device set 102 just like the first member device 120 according to the device information of multiple member devices transmitted from different member devices in the operation 604.

For example, the processing circuit 117 may compare the device information of the second member device 130 provided by the first member device 120 with the device information of the second member device 130 provided by the second member device 130 itself, to determine whether the second member device 130 belongs to the Bluetooth device set 102 or not. In this embodiment, if the device information of the second member device 130 provided by the first member device 120 is identical to the device information of the second member device 130 provided by the second member device 130 itself, then the processing circuit 117 may determine that both the first member device 120 and the second member device 130 belong to the Bluetooth device set 102.

The user can know which Bluetooth devices can be paired with the Bluetooth host device 110 from the candidate device list displayed on the display device 150. If the processing circuit 117 does not conduct filtering on the device items to be displayed in the candidate device list in the operation 606, multiple device items respectively representing multiple member devices of the Bluetooth device set 102 may be shown in the candidate device list. Such a Bluetooth pairing method is likely to be too complicated (because the user has to select multiple member devices to be paired with the Bluetooth host device 110 one by one), and even makes it difficult for the user to find the correct pairing object.

From another aspect, the operation of filtering device items to be shown in the candidate device list conducted by the processing circuit 117 in the aforementioned operation 606 can simplify the complexity of user's manipulation during the Bluetooth pairing procedure, and can reduce the possibility of user's erroneous manipulation.

The user may manipulate the input circuit 113 to select the Bluetooth device set 102 as the object to be paired with the Bluetooth host device 110.

In this situation, the input circuit 113 may perform the operation 608 to receive a selection command issued by the user, and transmit the selection command to the processing circuit 117.

In the operation 610, the processing circuit 117 may establish a connection with the first member device 120 through the host-side communication circuit 111 according to the selection command, and conduct a pairing procedure to generate a first cypher key Key-1.

In this situation, the first control circuit 125 may perform the operation 612 to establish a connection with the Bluetooth host device 110 through the first communication circuit 121, and conduct the pairing procedure to generate a second cypher key Key-2 corresponding to the first cypher key Key-1.

Please note that in the aforementioned operation 610 and operation 612, the Bluetooth host device 110 and the first member device 120 may adopt various appropriate approach to conduct the Bluetooth pairing procedure, and are not restricted to follow the pairing approach adopted in the aforementioned embodiment of FIG. 2 and FIG. 4. In addition, the Bluetooth host device 110 and the first member device 120 may adopt various appropriate approach to negotiate the parameters of key generation to respectively generate the first cypher key Key-1 and the second cypher key Key-2, and are not restricted to follow the key generation mechanism adopted in the aforementioned embodiment of FIG. 2 and FIG. 4.

As shown in FIG. 6, the processing circuit 117 of this embodiment further perform the operation 614 after generating the first cypher key Key-1 to create a correlation between the second member device 130 and the first cypher key Key-1.

On the other hand, the first control circuit 125 may further perform the operation 616 after generating the second cypher key Key-2 to utilize the first communication circuit 121 to transmit a device information of the Bluetooth host device 110 (e.g., a Bluetooth device address of the Bluetooth host device 110) and the second cypher key Key-2 to the second member device 130.

In this situation, the second communication circuit 131 of the second member device 130 may perform the operation 618 to receive the second cypher key Key-2 and the device information of the Bluetooth host device 110 transmitted from the first member device 120.

Then, the processing circuit 117 may perform the operation 620 to establish a connection with the second member device 130 through the host-side communication circuit 111, and directly use the first cypher key Key-1 to conduct Bluetooth data transmissions with the second member device 130.

The second control circuit 135 may perform the operation 622 to establish a connection with the Bluetooth host device 110 through the second communication circuit 131 according to the device information of the Bluetooth host device 110, and directly use the second cypher key Key-2 to conduct Bluetooth data transmissions with the Bluetooth host device 110.

In practice, the first control circuit 125 may adopt the aforementioned approach to transmit the aforementioned second cypher key Key-2 to other member devices in the Bluetooth device set 102 (e.g., the third member device 140), so that other member devices in the Bluetooth device set 102 can directly use the second cypher key Key-2 generated by the first member device 120 to conduct Bluetooth data transmissions with the Bluetooth host device 110.

In the embodiments where the Bluetooth host device 110, the first member device 120, and the second member device 130 support the BLE Audio technology, the Bluetooth host device 110 may adopt the BLE Audio technology to transmit audio data to the first member device 120 and the second member device 130, and the Bluetooth host device 110 can utilize the Low Complexity Communication Codec (LC3) to encode the audio data. As a result, it not only reduces the power consumption of the Bluetooth host device 110, the first member device 120, and the second member device 130 to thereby extend the serving time of the Bluetooth host device 110, the first member device 120, and the second member device 130, but also effectively improves the overall quality of the audio playback operations.

In the above embodiment of FIG. 6, the first member device 120 transmits the device information of the first member device 120 and the device information of the second member device 130 to the Bluetooth host device 110 in the operation 602. But this merely an exemplary embodiment, rather than a restriction to practical implementations. In practice, the first member device 120 may instead transmit the device information of the second member device 130 to the Bluetooth host device 110 at a different time point.

Figure 7:
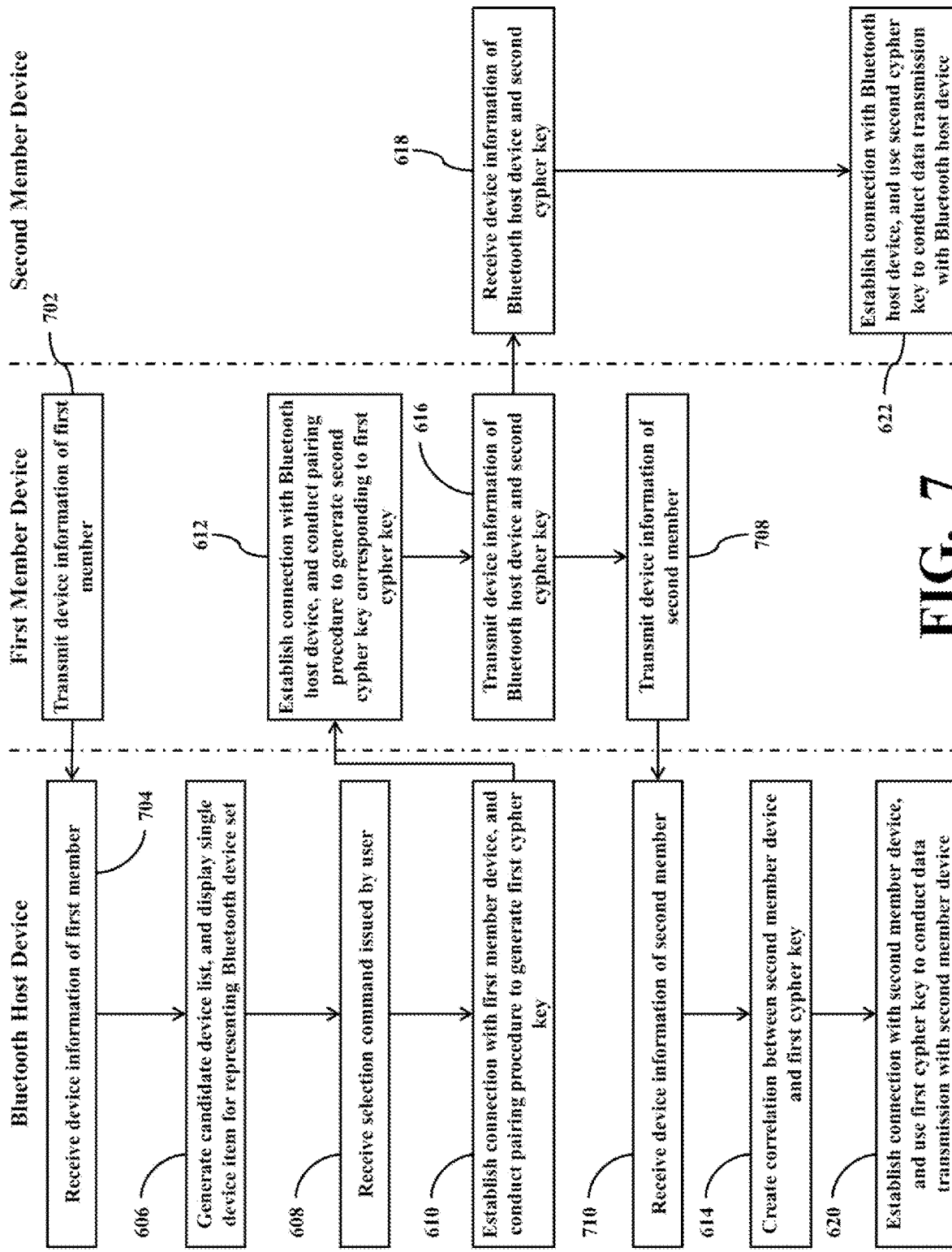
FIG. 7 shows a simplified flowchart of a method for generating cypher keys required for Bluetooth data transmission according to a fourth embodiment of the present disclosure.

For example, FIG. 7 shows a simplified flowchart of a method for generating cypher keys required for Bluetooth data transmission according to a fourth embodiment of the present disclosure. The method of FIG. 7 is similar with the method of aforementioned FIG. 6, but in the embodiment of FIG. 7, the first member device 120 performs the operation 702 instead of the operation 602.

In the operation 702, the first control circuit 125 utilizes the first communication circuit 121 to transmit a device information of the first member device 120 to the Bluetooth host device 110, but does not transmit the device information of other member devices (e.g., the second member device 130) to the Bluetooth host device 110. For example, the first control circuit 125 may generate one or more target Bluetooth packets containing the device information of the first member device 120 but not containing the device information of the second member device 130, and utilize the first communication circuit 121 to transmit the one or more target Bluetooth packets to the Bluetooth host device 110.

The type of the target Bluetooth packets referred to in the operation 72 may be the same as the type of the target Bluetooth packets referred to in the aforementioned operation 202. For the sake of brevity, the descriptions will not be repeated here.

In the operation 704, the host-side communication circuit 111 of the Bluetooth host device 110 may receive the device information of the first member device 120 transmitted from the first member device 120.

In the embodiment of FIG. 7, the first control circuit 125 performs the operation 708 to utilize the first communication circuit 121 to transmit the device information of the second member device 130 (e.g., a Bluetooth device address of the second member device 130) to the Bluetooth host device 110 after generating the second cypher key Key-2.

In this situation, the host-side communication circuit 111 may perform the operation 710 to receive the device information of the second member device 130 transmitted from the first member device 120.

Then, the processing circuit 117 may perform the operation 614 of FIG. 7 to create a correlation between the second member device 130 and the first cypher key Key-1.

The operations of the Bluetooth communication system 100 in others operations of FIG. 7 are the same as in the corresponding operations of the aforementioned embodiment of FIG. 6. Accordingly, the aforementioned descriptions regarding corresponding operations in FIG. 6 and related advantages are also applicable to the embodiment of FIG. 7. For the sake of brevity, the descriptions will not be repeated here.

According to the foregoing descriptions of FIG. 6 and FIG. 7, it can be appreciated that only the Bluetooth host device 110 and the first member device 120 are required to respectively generate the corresponding first cypher key Key-1 and second cypher key Key-2 in this embodiment. Other member devices (e.g., the second member device 130 and the third member device 140) would directly use the second cypher key Key-2 generated by the first member device 120 to conduct subsequent Bluetooth data transmissions with the Bluetooth host device 110, without generating related cypher keys by themselves. Accordingly, by adopting the method of FIG. 6 or FIG. 7, it can significantly reduce the time and computing loading of other member devices of the Bluetooth device set 102 (e.g., the second member device 130 and the third member device 140) required for negotiating the key parameters with the Bluetooth host device 110, and also save their time and computing load required for generating the cypher keys.

Additionally, in the embodiments of FIG. 6 and FIG. 7, the Bluetooth host device 110 only needs to negotiate the parameters of key generation with a single member device in the Bluetooth device set 102 (i.e., the first member device 120), and does not need to negotiate the parameters of key generation with other member devices of the Bluetooth device set 102 (e.g., the second member device 130 and the third member device 140). In other words, by adopting the method of FIG. 6 or FIG. 7, it can also greatly reduce the time and computing loading of the Bluetooth host device 110 required for negotiating the key parameters with other member devices and required for generating cypher keys.

Apparently, the method of above FIG. 6 and FIG. 7 can effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

Furthermore, the operation of filtering device items to be shown in the candidate device list conducted by the processing circuit 117 in the aforementioned operation 606 can simplify the complexity of user's manipulation during the Bluetooth pairing procedure, and also reduce the possibility of user's erroneous manipulation.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 8:
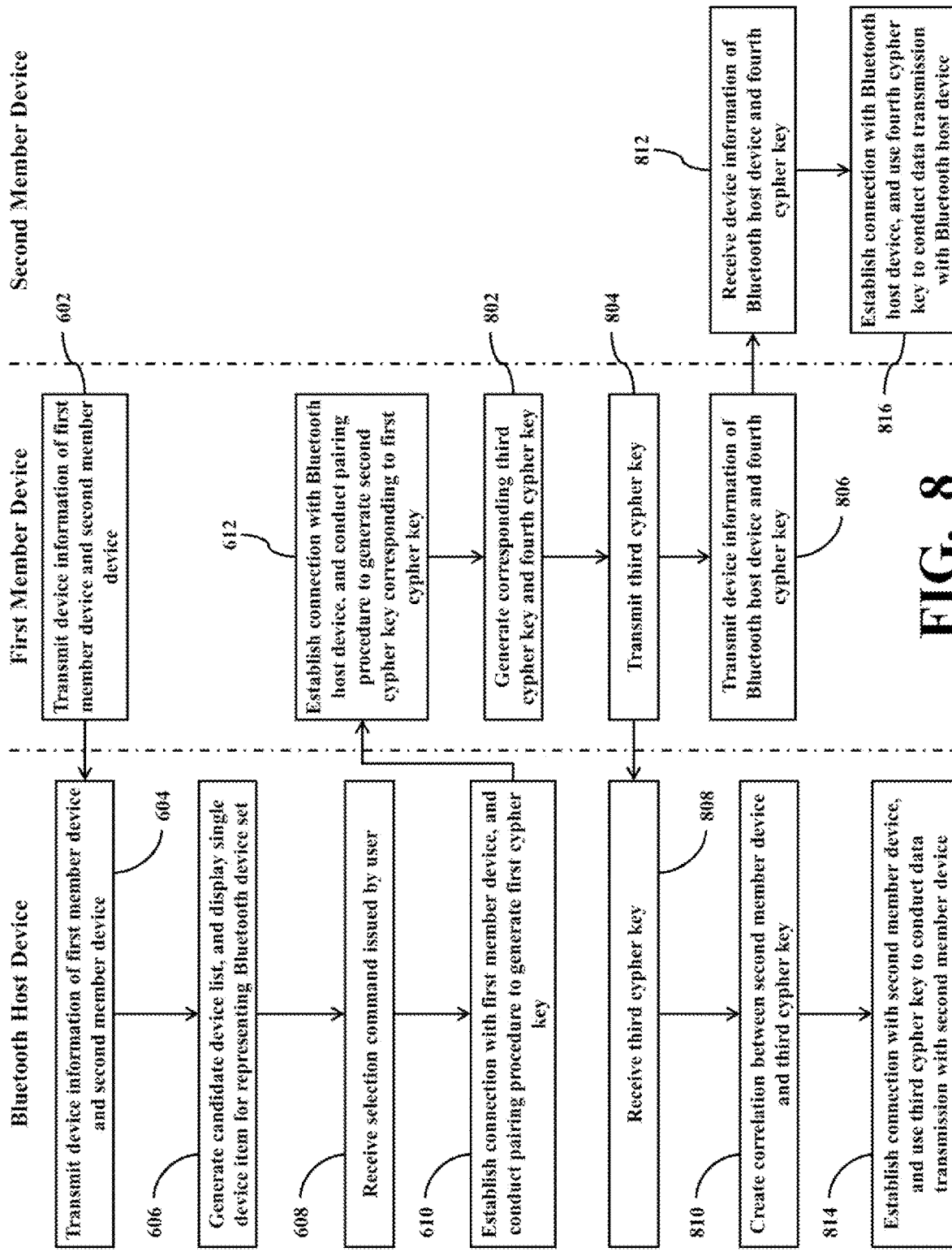
FIG. 8 shows a simplified flowchart of a method for generating cypher keys required for Bluetooth data transmission according to a fifth embodiment of the present disclosure.

Please refer to FIG. 8, which shows a simplified flowchart of a method for generating cypher keys required for Bluetooth data transmission according to a fifth embodiment of the present disclosure.

As described previously, when the Bluetooth host device 110 wants to conduct pairing with respective member devices of the Bluetooth device set 102, the processing circuit 117 may generate a Bluetooth inquiry request containing the device information of the Bluetooth host device 110 (e.g., a Bluetooth device address of the Bluetooth host device 110), and may utilize the host-side communication circuit 111 to transmit the Bluetooth inquiry request to other nearby Bluetooth devices.

Similarly, the processing circuit 117 may control the host-side communication circuit 111 to operate in the aforementioned predetermined receiving mode at an appropriate time according to the user's manipulation, or based on the default operating instructions of the internal programs.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

The first member device 120 may perform the operation 602 of FIG. 8 after entering the predetermined transmitting mode. The operations of the Bluetooth communication system 100 in the operation 602 through the operation 612 of FIG. 8 are the same as in the corresponding operations of the aforementioned embodiment of FIG. 6. Accordingly, the foregoing descriptions regarding corresponding operations in FIG. 6 and related advantages are also applicable to the embodiment of FIG. 8. For the sake of brevity, the descriptions will not be repeated here.

As shown in FIG. 8, after generating the second cypher key Key-2 in the operation 610, the first control circuit 125 of this embodiment may perform the operation 802.

In the operation 802, the first control circuit 125 may execute a predetermined cypher key algorithm to generate a third cypher key Key-3 and a corresponding fourth cypher key Key-4. Then, the first control circuit 125 may perform the operation 802 and the operation 804.

In the operation 804, the first control circuit 125 may utilize the first communication circuit 121 to transmit the third cypher key Key-3 to the Bluetooth host device 110.

In the operation 806, the first control circuit 125 may utilize the first communication circuit 121 to transmit a device information of the Bluetooth host device 110 (e.g., a Bluetooth device address of the Bluetooth host device 110) and the fourth cypher key Key-4 to the second member device 130.

In this situation, the Bluetooth host device 110 may perform the operation 808 and the operation 810, and the second member device 130 may perform the operation 812.

In the operation 808, the host-side communication circuit 111 may receive the third cypher key Key-3 transmitted from the first member device 120.

In the operation 810, the processing circuit 117 may create a correlation between the second member device 130 and the third cypher key Key-3.

In the operation 812, the second communication circuit 131 of the second member device 130 may receive the fourth cypher key Key-4 and the device information of the Bluetooth host device 110 transmitted from the first member device 120.

Then, the processing circuit 117 may perform the operation 814 to establish a connection with the second member device 130 through the host-side communication circuit 111, and directly use the third cypher key Key-3 generated by the first member device 120 to conduct Bluetooth data transmissions with the second member device 130.

The second control circuit 135 may perform the operation 816 to establish a connection with the Bluetooth host device 110 through the second communication circuit 131 according to the device information of the Bluetooth host device 110, and directly use the fourth cypher key Key-4 generated by the first member device 120 to conduct Bluetooth data transmissions with the Bluetooth host device 110.

In practice, the first control circuit 125 may generate required key pairs for conducting subsequent Bluetooth data transmissions for the Bluetooth host device 110 and other member devices by adopting the same approach described above.

In the embodiments where the Bluetooth host device 110, the first member device 120, and the second member device 130 support the BLE Audio technology, the Bluetooth host device 110 may adopt the BLE Audio technology to transmit audio data to the first member device 120 and the second member device 130, and the Bluetooth host device 110 can utilize the Low Complexity Communication Codec (LC3) to encode the audio data. As a result, it not only reduces the power consumption of the Bluetooth host device 110, the first member device 120, and the second member device 130 to thereby extend the serving time of the Bluetooth host device 110, the first member device 120, and the second member device 130, but also effectively improves the overall quality of the audio playback operations.

In the above embodiment of FIG. 8, the first member device 120 transmits the device information of the first member device 120 and the device information of the second member device 130 to the Bluetooth host device 110 in the operation 602. But this merely an exemplary embodiment, rather than a restriction to practical implementations. In practice, the first member device 120 may instead transmit the device information of the second member device 130 to the Bluetooth host device 110 at another different time point.

Figure 9:
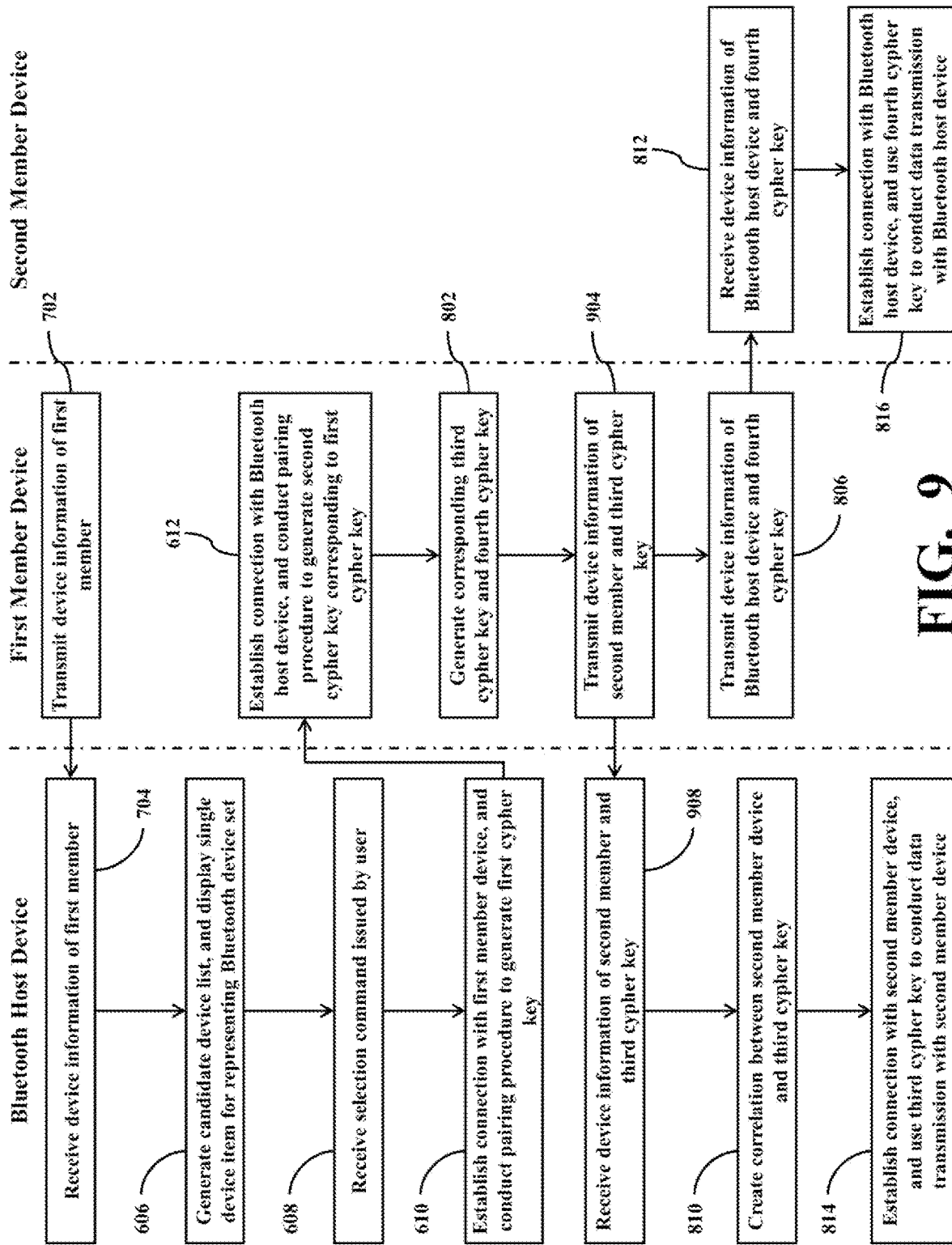
FIG. 9 shows a simplified flowchart of a method for generating cypher keys required for Bluetooth data transmission according to a sixth embodiment of the present disclosure.

For example, FIG. 9 shows a simplified flowchart of a method for generating cypher keys required for Bluetooth data transmission according to a sixth embodiment of the present disclosure. The method of FIG. 9 is similar with the method of aforementioned FIG. 8, but in the embodiment of FIG. 9, the first member device 120 performs the operation 702 instead of the operation 602.

As described previously, in the operation 702, the first control circuit 125 utilizes the first communication circuit 121 to transmit a device information of the first member device 120 to the Bluetooth host device 110, but does not transmit the device information of other member devices (e.g., the second member device 130) to the Bluetooth host device 110. For example, the first control circuit 125 may generate one or more target Bluetooth packets containing the device information of the first member device 120 but not containing the device information of the second member device 130, and utilize the first communication circuit 121 to transmit the one or more target Bluetooth packets to the Bluetooth host device 110.

The type of the target Bluetooth packets referred to in the operation 72 may be the same as the type of the target Bluetooth packets referred to in the aforementioned operation 202. For the sake of brevity, the descriptions will not be repeated here.

In the operation 704, the host-side communication circuit 111 of the Bluetooth host device 110 may receive the device information of the first member device 120 transmitted from the first member device 120.

In the embodiment of FIG. 9, the first control circuit 125 performs the operation 904 to utilize the first communication circuit 121 to transmit the device information of the second member device 130 (e.g., a Bluetooth device address of the second member device 130) and the third cypher key Key-3 to the Bluetooth host device 110 after generating the second cypher key Key-2 in the operation 612.

In this situation, the host-side communication circuit 111 may perform the operation 908 to receive the device information of the second member device 130 and the third cypher key Key-3 transmitted from the first member device 120.

Then, the processing circuit 117 may perform the operation 810 of FIG. 9 to create a correlation between the second member device 130 and the third cypher key Key-3.

Then, the processing circuit 117 may perform the operation 814 of FIG. 9 to establish a connection with the second member device 130 through the host-side communication circuit 111, and directly use the third cypher key Key-3 generated by the first member device 120 to conduct Bluetooth data transmissions with the second member device 130.

The second control circuit 135 may perform the operation 816 of FIG. 9 to establish a connection with the Bluetooth host device 110 through the second communication circuit 131 according to the device information of the Bluetooth host device 110, and directly use the fourth cypher key Key-4 generated by the first member device 120 to conduct Bluetooth data transmissions with the Bluetooth host device 110.

The operations of the Bluetooth communication system 100 in others operations of FIG. 9 are the same as in the corresponding operations of the aforementioned embodiments of FIG. 6, FIG. 7, or FIG. 8. Accordingly, the aforementioned descriptions regarding corresponding operations in FIG. 6, FIG. 7, FIG. 8, and related advantages are also applicable to the embodiment of FIG. 9. For the sake of brevity, the descriptions will not be repeated here.

According to the foregoing descriptions of FIG. 8 and FIG. 9, it can be appreciated that only the Bluetooth host device 110 and the first member device 120 are required to respectively generate the corresponding first cypher key Key-1 and second cypher key Key-2 in this embodiment. However, the required cypher keys for conducting subsequent Bluetooth data transmissions between the Bluetooth host device 110 and other member devices in the Bluetooth device set 102 (e.g., the second member device 130 and the third member device 140) are generated by the first member device 120 alone. Accordingly, by adopting the method of FIG. 8 or FIG. 9, it can significantly reduce the time and computing loading of other member devices of the Bluetooth device set 102 (e.g., the second member device 130 and the third member device 140) required for negotiating the key parameters with the Bluetooth host device 110, and also save their time and computing load required for generating the cypher keys.

Additionally, in the embodiments of FIG. 8 and FIG. 9, the Bluetooth host device 110 only needs to negotiate the parameters of key generation with a single member device in the Bluetooth device set 102 (i.e., the first member device 120), and does not need to negotiate the parameters of key generation with other member devices of the Bluetooth device set 102 (e.g., the second member device 130 and the third member device 140). In other words, by adopting the method of FIG. 8 or FIG. 9, it can also greatly reduce the time and computing loading of the Bluetooth host device 110 required for negotiating the key parameters with other member devices and required for generating cypher keys.

Apparently, the method of above FIG. 8 and FIG. 9 can effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

Furthermore, the operation of filtering device items to be shown in the candidate device list conducted by the processing circuit 117 in the aforementioned operation 606 can simplify the complexity of user's manipulation during the Bluetooth pairing procedure, and also reduce the possibility of user's erroneous manipulation.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 10:
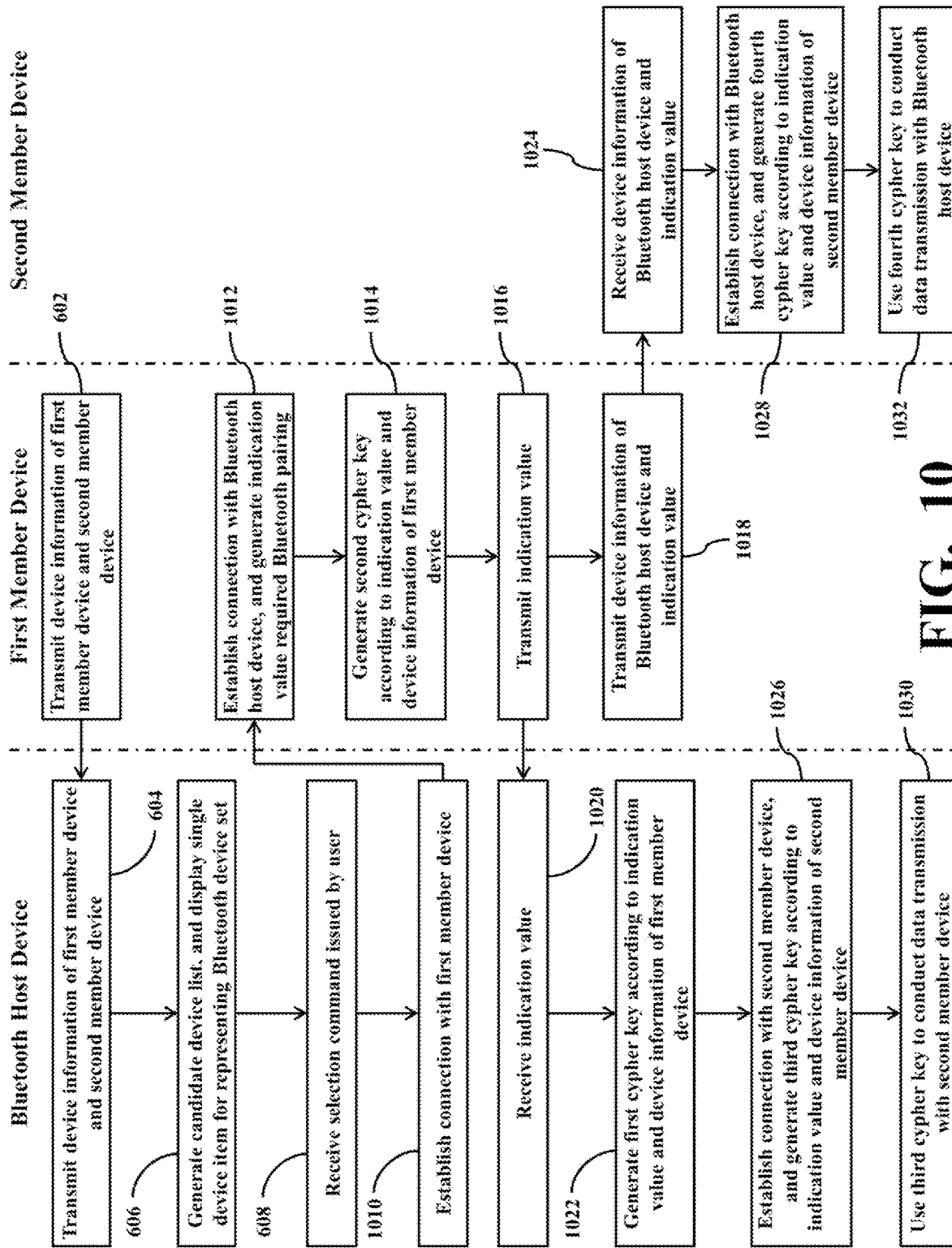
FIG. 10 shows a simplified flowchart of a method for generating cypher keys required for Bluetooth data transmission according to a seventh embodiment of the present disclosure.

Please refer to FIG. 10, which shows a simplified flowchart of a method for generating cypher keys required for Bluetooth data transmission according to a seventh embodiment of the present disclosure.

As described previously, when the Bluetooth host device 110 wants to conduct pairing with respective member devices of the Bluetooth device set 102, the processing circuit 117 may generate a Bluetooth inquiry request containing the device information of the Bluetooth host device 110 (e.g., a Bluetooth device address of the Bluetooth host device 110), and may utilize the host-side communication circuit 111 to transmit the Bluetooth inquiry request to other nearby Bluetooth devices.

Similarly, the processing circuit 117 may control the host-side communication circuit 111 to operate in the aforementioned predetermined receiving mode at an appropriate time according to the user's manipulation, or based on the default operating instructions of the internal programs.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

The first member device 120 may perform the operation 602 of FIG. 10 after entering the predetermined transmitting mode. The operations of the Bluetooth communication system 100 in the operation 602 through the operation 608 of FIG. 10 are the same as in the corresponding operations of the aforementioned embodiment of FIG. 6. Accordingly, the foregoing descriptions regarding corresponding operations in FIG. 6 and related advantages are also applicable to the embodiment of FIG. 10. For the sake of brevity, the descriptions will not be repeated here.

As shown in FIG. 10, the Bluetooth host device 110 of this embodiment may perform the operation 1010 after receiving a selection command issued by the user in the operation 608.

In the operation 1010, the processing circuit 117 may establish a connection with the first member device 120 through the host-side communication circuit 111 according to the selection command, and transmit a device information of the Bluetooth host device 110 (e.g., a Bluetooth device address of the Bluetooth host device 110) to the first member device 120.

In this situation, the first communication circuit 121 may perform the operation 1012 to receive the device information of the Bluetooth host device 110, and may establish a connection with the Bluetooth host device 110 under control of the first control circuit 125. In addition, the first control circuit 125 further generate an indication value required for conducting the Bluetooth pairing between the Bluetooth host device 110 and the first member device 120 in the operation 1012.

In one embodiment, the aforementioned indication value is a predetermined value, a random value, a predetermined address, a random address, a predetermined string, a random string, a predetermined token, a random token, or the like for use in a predetermined cypher key algorithm. In another embodiment, the aforementioned indication value is an algorithm identifier corresponding to a predetermined cypher key algorithm.

After generating the indication value, the first member device 120 may perform the operation 1014, the operation 1016, and the operation 1018.

In the operation 1014, the first control circuit 125 may generate a second cypher key Key-2 according to the indication value and a device information of the first member device 120 (e.g., a Bluetooth device address of the first member device 120). For example, the first control circuit 125 may execute the aforementioned predetermined cypher key algorithm to generate the second cypher key Key-2 according to the indication value and the device information of the first member device 120. For another example, the first control circuit 125 may execute the aforementioned predetermined cypher key algorithm to generate the second cypher key Key-2 according to the indication value, the device information of the first member device 120, and the device information of the Bluetooth host device 110. For another example, the first control circuit 125 may select a predetermined cypher key algorithm from a plurality of pre-agreed key algorithms according to the indication value, and execute the selected predetermined cypher key algorithm to generate the second cypher key Key-2.

In the operation 1016, the first control circuit 125 may utilize the first communication circuit 121 to transmit the indication value to the Bluetooth host device 110.

In the operation 1018, the first control circuit 125 may utilize the first communication circuit 121 to transmit the device information of the Bluetooth host device 110 and the indication value to the second member device 130.

In this situation, the Bluetooth host device 110 may perform the operation 1020 and the operation 1022 of FIG. 10, and the second member device 130 may perform the operation 1024 of FIG. 10.

In the operation 1020, the host-side communication circuit 111 may receive the indication value.

In the operation 1022, the processing circuit 117 may generate a first cypher key Key-1 according to the indication value and the device information of the first member device 120. For example, the processing circuit 117 may execute the aforementioned predetermined cypher key algorithm to generate the first cypher key Key-1 according to the indication value and the device information of the first member device 120. For another example, the processing circuit 117 may execute the aforementioned predetermined cypher key algorithm to generate the first cypher key Key-1 according to the indication value, the device information of the first member device 120, and the device information of the Bluetooth host device 110. For another example, the processing circuit 117 may select a predetermined cypher key algorithm from a plurality of pre-agreed key algorithms according to the indication value, and execute the selected predetermined cypher key algorithm to generate the first cypher key Key-1.

In the operation 1024, the second communication circuit 131 may receive the device information of the Bluetooth host device 110 and the indication value transmitted from the first member device 120.

In the operation 1026, the processing circuit 117 may establish a connection with the second member device 130 through the host-side communication circuit 111 according to a device information of the second member device 130 (e.g., a Bluetooth device address of the second member device 130) transmitted from the first member device 120 in the operation 602, and generate a third cypher key Key-3 according to the indication value and the device information of the second member device 130. For example, the processing circuit 117 may execute the aforementioned predetermined cypher key algorithm to generate the third cypher key Key-3 according to the indication value and the device information of the second member device 130. For another example, the processing circuit 117 may execute the aforementioned predetermined cypher key algorithm to generate the third cypher key Key-3 according to the indication value, the second member device 130, and the device information of the Bluetooth host device 110. For another example, the processing circuit 117 may select a predetermined cypher key algorithm from a plurality of pre-agreed key algorithms according to the indication value, and execute the selected predetermined cypher key algorithm to generate the third cypher key Key-3.

In this situation, the second member device 130 may perform the operation 1028.

In the operation 1028, the second control circuit 135 may establish a connection with the Bluetooth host device 110 through the second communication circuit 131, and generate a fourth cypher key Key-4 corresponding to the third cypher key Key-3 according to the indication value and the device information of the second member device 130. For example, the second control circuit 135 may execute the aforementioned predetermined cypher key algorithm to generate the fourth cypher key Key-4 according to the indication value and the device information of the second member device 130. For another example, the second control circuit 135 may execute the aforementioned predetermined cypher key algorithm to generate the fourth cypher key Key-4 according to the indication value, the device information of the second member device 130, and the device information of the Bluetooth host device 110. For another example, the second control circuit 135 may select a predetermined cypher key algorithm from a plurality of pre-agreed key algorithms according to the indication value, and execute the selected predetermined cypher key algorithm to generate the fourth cypher key Key-4.

In other words, after the indication value is generated by the first member device 120, the Bluetooth host device 110 and the first member device 120 may omit many traditional key parameter negotiation steps, and instead adopt a highly simplified approach to generate the corresponding first cypher key Key-1 and second cypher key Key-2. Similarly, the Bluetooth host device 110 and the second member device 130 may also omit many traditional key parameter negotiation steps, and instead adopt a highly simplified approach to generate the corresponding third cypher key Key-3 and fourth cypher key Key-4. As a result, it can significantly reduce the required time for generating the first cypher key Key-1, the second cypher key Key-2, the third cypher key Key-3, and the fourth cypher key Key-4.

In the operation 1030, the processing circuit 117 of the Bluetooth host device 110 may use the third cypher key Key-3 to conduct Bluetooth data transmissions with the second member device 130 through the host-side communication circuit 111.

In the operation 1032, the second control circuit 135 of the second member device 130 may use the fourth cypher key Key-4 to conduct Bluetooth data transmissions with the Bluetooth host device 110 through the second communication circuit 131.

In practice, the Bluetooth host device 110 and other member devices in the Bluetooth device set 102 (e.g., the third member device 140) may adopt the aforementioned approach to respectively generate the cypher keys required for conducting subsequent Bluetooth data transmission according to the indication value generated by the first member device 120.

Similarly, in the embodiments where the Bluetooth host device 110, the first member device 120, and the second member device 130 support the BLE Audio technology, the Bluetooth host device 110 may adopt the BLE Audio technology to transmit audio data to the first member device 120 and the second member device 130, and the Bluetooth host device 110 can utilize the Low Complexity Communication Codec (LC3) to encode the audio data. As a result, it not only reduces the power consumption of the Bluetooth host device 110, the first member device 120, and the second member device 130 to thereby extend the serving time of the Bluetooth host device 110, the first member device 120, and the second member device 130, but also effectively improves the overall quality of the audio playback operations.

In the above embodiment of FIG. 10, the first member device 120 transmits the device information of the first member device 120 and the device information of the second member device 130 to the Bluetooth host device 110 in the operation 602. But this merely an exemplary embodiment, rather than a restriction to practical implementations. In practice, the first member device 120 may instead transmit the device information of the second member device 130 to the Bluetooth host device 110 at another different time point.

Figure 11:
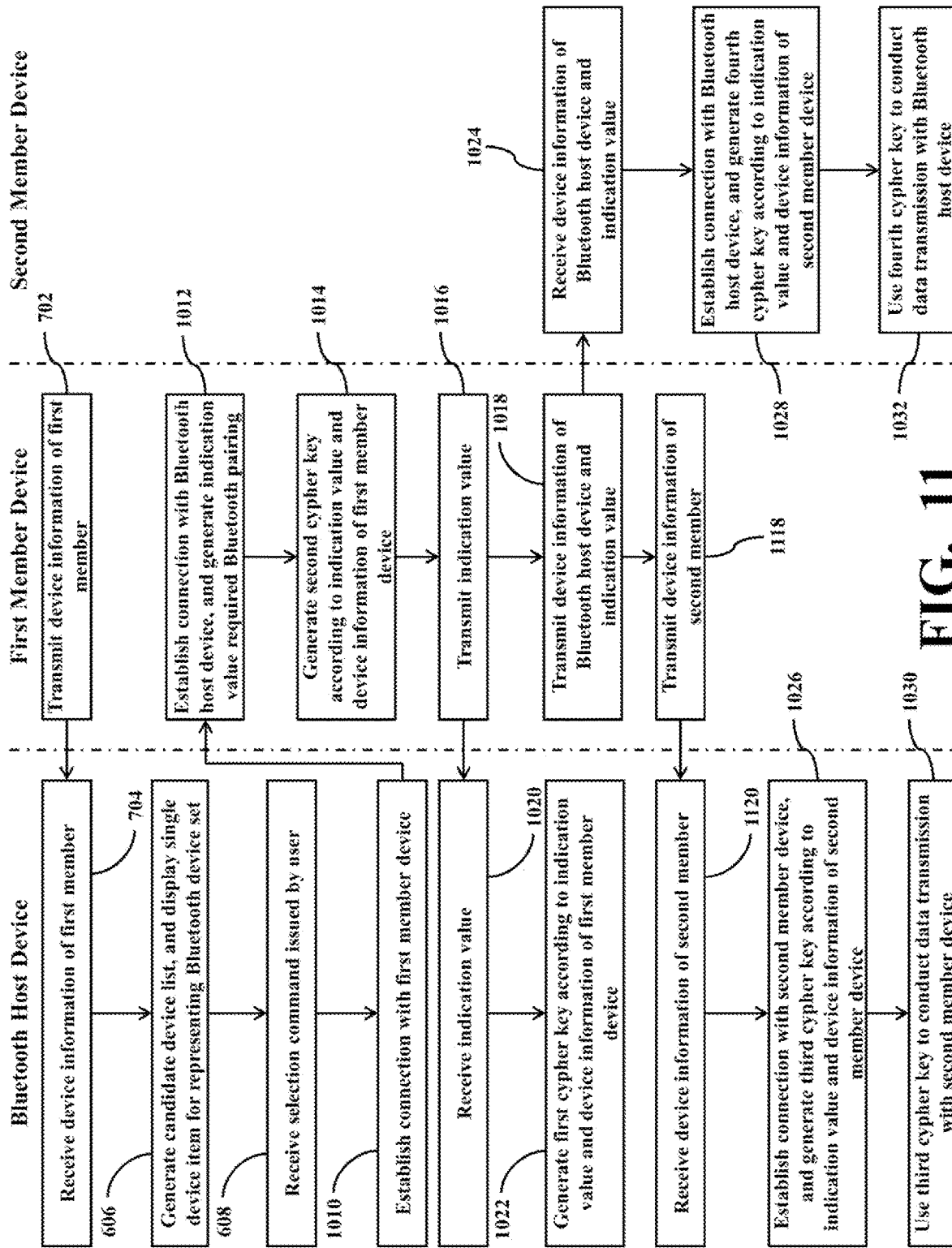
FIG. 11 shows a simplified flowchart of a method for generating cypher keys required for Bluetooth data transmission according to an eighth embodiment of the present disclosure.

For example, FIG. 11 shows a simplified flowchart of a method for generating cypher keys required for Bluetooth data transmission according to an eighth embodiment of the present disclosure. The method of FIG. 11 is similar with the method of aforementioned FIG. 10, but in the embodiment of FIG. 11, the first member device 120 performs the operation 702 instead of the operation 602.

As described previously, in the operation 702, the first control circuit 125 utilizes the first communication circuit 121 to transmit a device information of the first member device 120 to the Bluetooth host device 110, but does not transmit the device information of other member devices (e.g., the second member device 130) to the Bluetooth host device 110. For example, the first control circuit 125 may generate one or more target Bluetooth packets containing the device information of the first member device 120 but not containing the device information of the second member device 130, and utilize the first communication circuit 121 to transmit the one or more target Bluetooth packets to the Bluetooth host device 110.

The type of the target Bluetooth packets referred to in the operation 72 may be the same as the type of the target Bluetooth packets referred to in the aforementioned operation 202. For the sake of brevity, the descriptions will not be repeated here.

In the operation 704, the host-side communication circuit 111 of the Bluetooth host device 110 may receive the device information of the first member device 120 transmitted from the first member device 120.

In the embodiment of FIG. 11, the first control circuit 125 performs the operation 1118 to utilize the first communication circuit 121 to transmit the device information of the second member device 130 (e.g., a Bluetooth device address of the second member device 130) to the Bluetooth host device 110 after generating the second cypher key Key-2 in the operation 1014.

In this situation, the host-side communication circuit 111 may perform the operation 1120 to receive the device information of the second member device 130 transmitted from the first member device 120.

The operations of the Bluetooth communication system 100 in others operations of FIG. 11 are the same as in the corresponding operations of the aforementioned embodiments of FIG. 6, FIG. 7, or FIG. 8. Accordingly, the aforementioned descriptions regarding corresponding operations in FIG. 6, FIG. 7, FIG. 8, and related advantages are also applicable to the embodiment of FIG. 9. For the sake of brevity, the descriptions will not be repeated here.

According to the foregoing descriptions of FIG. 6 and FIG. 7, it can be appreciated that after the aforementioned indication value is generated by the first member device 120, the Bluetooth host device 110 and the first member device 120 may omit many traditional key parameter negotiation steps, and instead adopt a highly simplified approach to generate the corresponding first cypher key Key-1 and second cypher key Key-2. That is, the Bluetooth host device 110 is enabled to generate the first cypher key Key-1 by simply performing the aforementioned operation 1020 and operation 1022 while the first member device 120 is enabled to generate the second cypher key Key-2 by simply performing the aforementioned operation 1014. As a result, it can significantly reduce the required time for generating the first cypher key Key-1 and the second cypher key Key-2.

Similarly, the Bluetooth host device 110 and the second member device 130 can also omit many traditional key parameter negotiation steps, and instead adopt a highly simplified approach to generate the corresponding third cypher key Key-3 and fourth cypher key Key-4. That is, the Bluetooth host device 110 is enabled to generate the third cypher key Key-3 by simply performing the aforementioned operation 1026 while the second member device 130 is enabled to generate the fourth cypher key Key-4 by simply performing the aforementioned operation 1028. As a result, it can significantly reduce the required time for generating the third cypher key Key-3 and the fourth cypher key Key-4.

Apparently, the method of above FIG. 10 and FIG. 11 can effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

Furthermore, the operation of filtering device items to be shown in the candidate device list conducted by the processing circuit 117 in the aforementioned operation 606 can simplify the complexity of user's manipulation during the Bluetooth pairing procedure, and also reduce the possibility of user's erroneous manipulation.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 12:
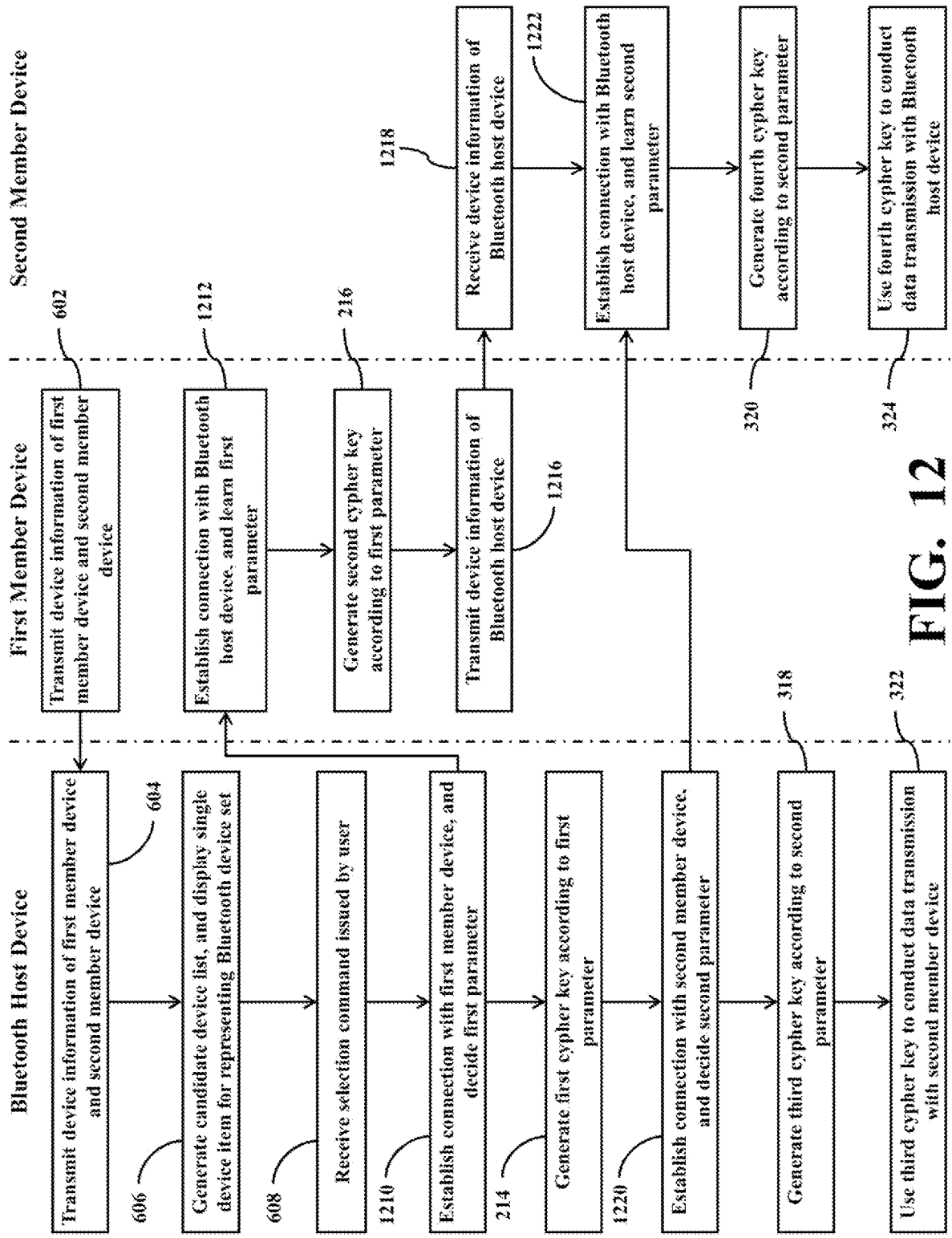
FIG. 12 shows a simplified flowchart of a method for generating cypher keys required for Bluetooth data transmission according to a ninth embodiment of the present disclosure.

Please refer to FIG. 12, which shows a simplified flowchart of a method for generating cypher keys required for Bluetooth data transmission according to a ninth embodiment of the present disclosure.

As described previously, when the Bluetooth host device 110 wants to conduct pairing with respective member devices of the Bluetooth device set 102, the processing circuit 117 may generate a Bluetooth inquiry request containing the device information of the Bluetooth host device 110 (e.g., a Bluetooth device address of the Bluetooth host device 110), and may utilize the host-side communication circuit 111 to transmit the Bluetooth inquiry request to other nearby Bluetooth devices.

Similarly, the processing circuit 117 may control the host-side communication circuit 111 to operate in the aforementioned predetermined receiving mode at an appropriate time according to the user's manipulation, or based on the default operating instructions of the internal programs.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

The first member device 120 may perform the operation 602 of FIG. 12 after entering the predetermined transmitting mode. The operations of the Bluetooth communication system 100 in the operation 602 through the operation 608 of FIG. 12 are the same as in the corresponding operations of the aforementioned embodiment of FIG. 6. Accordingly, the foregoing descriptions regarding corresponding operations in FIG. 6 and related advantages are also applicable to the embodiment of FIG. 12. For the sake of brevity, the descriptions will not be repeated here.

As shown in FIG. 12, the Bluetooth host device 110 of this embodiment may perform the operation 1210 after receiving a selection command issued by the user in the operation 608.

In the operation 1210, the processing circuit 117 may establish a connection with the first member device 120 through the host-side communication circuit 111 according to the selection command, and may decide a first parameter P1. The processing circuit 117 may adopt the same approach as employed in the aforementioned operation 210 to decide the first parameter P1. Accordingly, the foregoing descriptions regarding how to decide the first parameter P1 in the operation 210 are also applicable to the operation 1210, and will not be repeated here for the sake of brevity. The processing circuit 117 may also transmit the first parameter P1 or a first field indication to the first member device 120 through the host-side communication circuit 111 in the operation 1210, wherein the first field indication is utilized for indicating a specific packet field whose content is to be utilized as the first parameter P1.

In this situation, the first communication circuit 121 of the first member device 120 may perform the operation 1212 to establish a connection with the Bluetooth host device 110, and to receive the first parameter P1 or a related first field indication transmitted from the Bluetooth host device 110, so that the first control circuit 125 is enabled to learn the first parameter P1 decided by the Bluetooth host device 110 accordingly.

As shown in FIG. 12, the processing circuit 117 then may perform the operation 214 to generate a first cypher key Key-1 required for conducting subsequent Bluetooth data transmissions with the first member device 120 according to the first parameter P1. For example, the processing circuit 117 may execute a predetermined cypher key algorithm to generate the first cypher key Key-1 according to the first parameter P1 and the device information of the Bluetooth host device 110. For another example, the processing circuit 117 may execute the aforementioned predetermined cypher key algorithm to generate the first cypher key Key-1 according to the first parameter P1, the device information of the Bluetooth host device 110, and the device information of the first member device 120.

On the other hand, the first control circuit 125 may perform the operation 216 to generate a second cypher key Key-2 required for conducting subsequent Bluetooth data transmissions with the Bluetooth host device 110 according to the first parameter P1. In other words, the second cypher key Key-2 generated by the first control circuit 125 and the first cypher key Key-1 generated by the processing circuit 117 will correspond to each other. For example, the first control circuit 125 may execute the aforementioned predetermined cypher key algorithm to generate the second cypher key Key-2 according to the first parameter P1 and the device information of the first member device 120. For another example, the first control circuit 125 may execute the aforementioned predetermined cypher key algorithm to generate the second cypher key Key-2 according to the first parameter P1, the device information of the first member device 120, and the device information of the Bluetooth host device 110.

In other words, after the first parameter P1 is decided by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. That is, the Bluetooth host device 110 can directly generate the first cypher key Key-1 based on the first parameter P1 decided by the Bluetooth host device 110, and the first member device 120 can directly generate the second cypher key Key-2 based on the first parameter P1 decided by the Bluetooth host device 110. As a result, it can significantly reduce the required time for generating the first cypher key Key-1 and the second cypher key Key-2.

Afterwards, the processing circuit 117 may use the first cypher key Key-1 to conduct Bluetooth data transmissions with the first member device 120 through the host-side communication circuit 111, and the first control circuit 125 may use the second cypher key Key-2 to conduct Bluetooth data transmissions with the Bluetooth host device 110 through the first communication circuit 121.

As shown in FIG. 12, the first control circuit 125 may further perform the operation 1216 to utilize the first communication circuit 121 to transmit the device information of the Bluetooth host device 110 to the second member device 130.

In this situation, the second communication circuit 131 may perform the operation 1218 of FIG. 12 to receive the device information of the Bluetooth host device 110 transmitted from the first member device 120.

As shown in FIG. 12, the Bluetooth host device 110 of this embodiment may further perform the operation 1220.

In the operation 1220, the processing circuit 117 may establish a connection with the second member device 130 through the host-side communication circuit 111 according to a device information of the second member device 130 (e.g., a Bluetooth device address of the second member device 130) transmitted from the first member device 120 in the operation 602, and may decide a second parameter P2. The processing circuit 117 may adopt the same approach as employed in the aforementioned operation 314 to decide the second parameter P2. Accordingly, the foregoing descriptions regarding how to decide the second parameter P2 in the operation 314 are also applicable to the operation 1220, and will not be repeated here for the sake of brevity. The processing circuit 117 may also transmit the second parameter P2 or a second field indication to the first member device 120 through the host-side communication circuit 111 in the operation 1220, wherein the second field indication is utilized for indicating a specific packet field whose content is to be utilized as the second parameter P2.

In this situation, the first communication circuit 121 of the first member device 120 may perform the operation 1222 to establish a connection with the Bluetooth host device 110, and to receive the second parameter P2 or a related second field indication transmitted from the Bluetooth host device 110, so that the first control circuit 125 is enabled to learn the second parameter P2 decided by the Bluetooth host device 110 accordingly.

As shown in FIG. 12, the processing circuit 117 then may perform the operation 318 to generate a third cypher key Key-3 required for conducting subsequent Bluetooth data transmissions with the second member device 130 according to the second parameter P2. For example, the processing circuit 117 may execute a predetermined cypher key algorithm according to the second parameter P2 and the device information of the Bluetooth host device 110 to generate the third cypher key Key-3. For another example, the processing circuit 117 may execute the aforementioned predetermined cypher key algorithm according to the second parameter P2, the device information of the second member device 130, and the device information of the Bluetooth host device 110 to generate the third cypher key Key-3.

On the other hand, the second control circuit 135 may perform the operation 320 to generate a fourth cypher key Key-4 required for conducting subsequent Bluetooth data transmissions with the Bluetooth host device 110 according to the second parameter P2. In other words, the fourth cypher key Key-4 generated by the second control circuit 135 and the third cypher key Key-3 generated by the processing circuit 117 will correspond to each other. For example, the second control circuit 135 may generate the aforementioned predetermined cypher key algorithm according to the second parameter P2 and the device information of the second member device 130 to generate the fourth cypher key Key-4. For another example, the second control circuit 135 may execute the aforementioned predetermined cypher key algorithm according to the second parameter P2, the device information of the second member device 130, and the device information of the Bluetooth host device 110 to generate the fourth cypher key Key-4.

In other words, after the second parameter P2 is decided by the Bluetooth host device 110, the Bluetooth host device 110 and the second member device 130 may omit many traditional key parameter negotiation steps, and instead adopt a highly simplified approach to generate the corresponding third cypher key Key-3 and fourth cypher key Key-4. That is, the Bluetooth host device 110 can directly generate the third cypher key Key-3 based on the second parameter P2 decided by the Bluetooth host device 110 while the second member device 130 can directly generate the fourth cypher key Key-4 based on the second parameter P2 decided by the Bluetooth host device 110. As a result, it can significantly reduce the required time for generating the third cypher key Key-3 and the fourth cypher key Key-4.

Afterwards, the processing circuit 117 may perform the operation 322 of FIG. 12 to use the third cypher key Key-3 to conduct Bluetooth data transmissions with the second member device 130 through the host-side communication circuit 111.

On the other hand, the second control circuit 135 may perform the operation 324 of FIG. 12 to use the fourth cypher key Key-4 to conduct Bluetooth data transmissions with the Bluetooth host device 110 through the second communication circuit 131.

Similarly, in the embodiments where the Bluetooth host device 110, the first member device 120, and the second member device 130 support the BLE Audio technology, the Bluetooth host device 110 may adopt the BLE Audio technology to transmit audio data to the first member device 120 and the second member device 130, and the Bluetooth host device 110 can utilize the Low Complexity Communication Codec (LC3) to encode the audio data. As a result, it not only reduces the power consumption of the Bluetooth host device 110, the first member device 120, and the second member device 130 to thereby extend the serving time of the Bluetooth host device 110, the first member device 120, and the second member device 130, but also effectively improves the overall quality of the audio playback operations.

In the above embodiment of FIG. 12, the first member device 120 transmits the device information of the first member device 120 and the device information of the second member device 130 to the Bluetooth host device 110 in the operation 602. But this merely an exemplary embodiment, rather than a restriction to practical implementations. In practice, the first member device 120 may instead transmit the device information of the second member device 130 to the Bluetooth host device 110 at another different time point.

Figure 13:
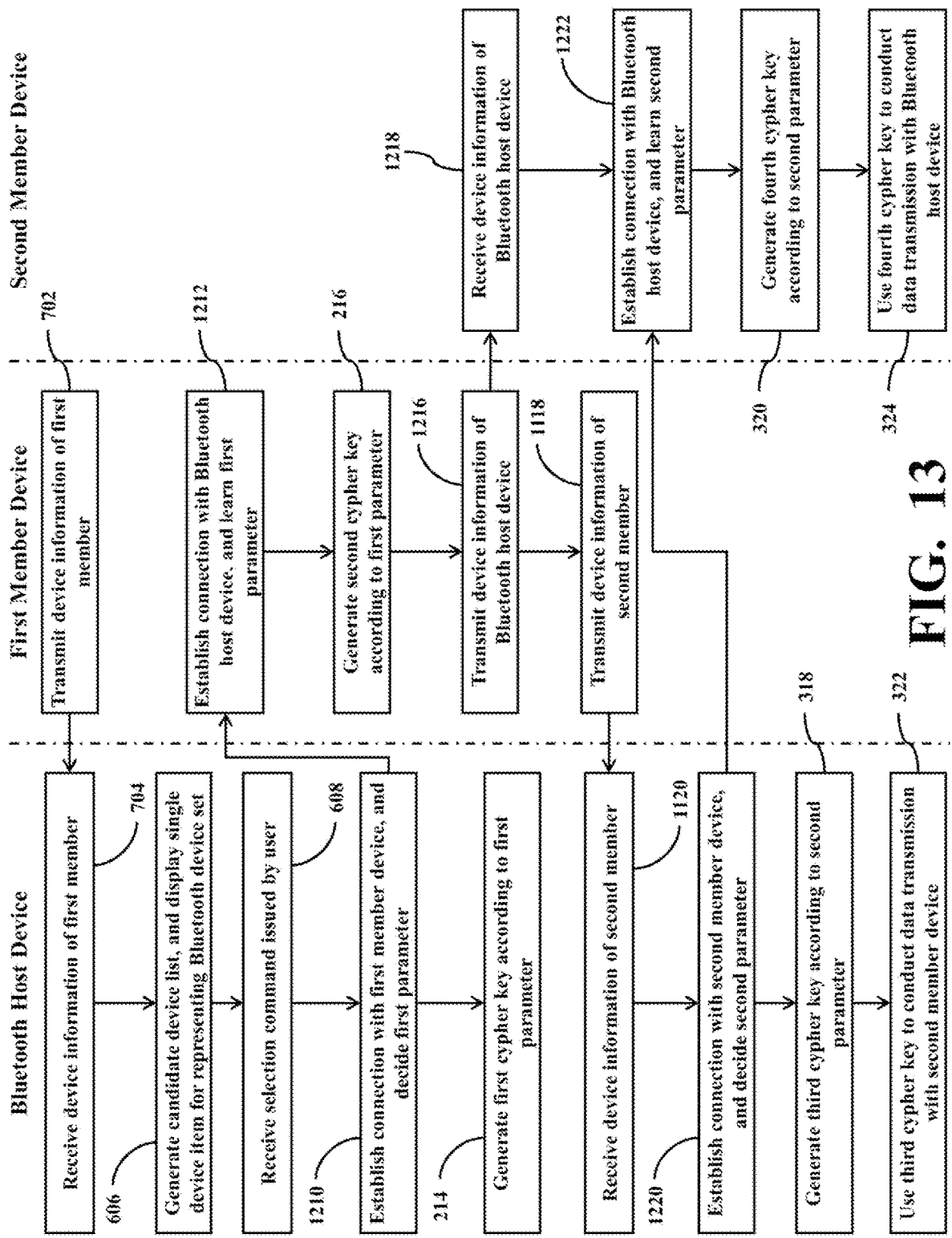
FIG. 13 shows a simplified flowchart of a method for generating cypher keys required for Bluetooth data transmission according to a tenth embodiment of the present disclosure.

For example, FIG. 13 shows a simplified flowchart of a method for generating cypher keys required for Bluetooth data transmission according to a tenth embodiment of the present disclosure. The method of FIG. 13 is similar with the method of aforementioned FIG. 12, but in the embodiment of FIG. 13, the first member device 120 performs the operation 702 instead of the operation 602.

As described previously, in the operation 702, the first control circuit 125 utilizes the first communication circuit 121 to transmit a device information of the first member device 120 to the Bluetooth host device 110, but does not transmit the device information of other member devices (e.g., the second member device 130) to the Bluetooth host device 110. For example, the first control circuit 125 may generate one or more target Bluetooth packets containing the device information of the first member device 120 but not containing the device information of the second member device 130, and utilize the first communication circuit 121 to transmit the one or more target Bluetooth packets to the Bluetooth host device 110.

The type of the target Bluetooth packets referred to in the operation 72 may be the same as the type of the target Bluetooth packets referred to in the aforementioned operation 202. For the sake of brevity, the descriptions will not be repeated here.

In the operation 704, the host-side communication circuit 111 of the Bluetooth host device 110 may receive the device information of the first member device 120 transmitted from the first member device 120.

In the embodiment of FIG. 11, the first control circuit 125 performs the operation 1118 to utilize the first communication circuit 121 to transmit the device information of the second member device 130 (e.g., a Bluetooth device address of the second member device 130) to the Bluetooth host device 110 after generating the second cypher key Key-2 in the operation 216.

In this situation, the host-side communication circuit 111 may perform the operation 1120 to receive the device information of the second member device 130 transmitted from the first member device 120.

The operations of the Bluetooth communication system 100 in others operations of FIG. 13 are the same as in the corresponding operations of the aforementioned embodiments of FIG. 2, FIG. 3, FIG. 6, FIG. 7, or FIG. 23. Accordingly, the aforementioned descriptions regarding corresponding operations in FIG. 2, FIG. 3, FIG. 6, FIG. 7, FIG. 23, and related advantages are also applicable to the embodiment of FIG. 13. For the sake of brevity, the descriptions will not be repeated here.

According to the foregoing descriptions of FIG. 12 and FIG. 13, it can be appreciated that after the first parameter P1 is decided by the Bluetooth host device 110, the Bluetooth host device 110 and the first member device 120 can omit many traditional key parameter negotiation steps, and instead adopt a highly simplified approach to generate the corresponding first cypher key Key-1 and second cypher key Key-2. As a result, it can significantly reduce the required time for generating the first cypher key Key-1 and the second cypher key Key-2.

Similarly, after the first parameter P1 is decided by the Bluetooth host device 110, the Bluetooth host device 110 and the second member device 130 can also omit many traditional key parameter negotiation steps, and instead adopt a highly simplified approach to generate the corresponding third cypher key Key-3 and fourth cypher key Key-4. As a result, it can significantly reduce the required time for generating the third cypher key Key-3 and the fourth cypher key Key-4.

Apparently, the method of above FIG. 12 and FIG. 13 can effectively simplify the Bluetooth pairing procedure between the Bluetooth host device 110 and respective member device of the Bluetooth device set 102, thereby significantly reduce the required time for completing the pairing procedure between the Bluetooth host device 110 and the Bluetooth device set 102.

Furthermore, the operation of filtering device items to be shown in the candidate device list conducted by the processing circuit 117 in the aforementioned operation 606 can simplify the complexity of user's manipulation during the Bluetooth pairing procedure, and also reduce the possibility of user's erroneous manipulation.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Please note that the aforementioned executing order of the operations in each flowchart is merely an exemplary embodiment, rather than a restriction to the practical implementations of the present disclosure.

For example, in FIG. 2, the operation 214 may be performed at the same time with the operation 210, or may be performed before transmitting the first privileged pairing notice, the first parameter P1, and/or a first field indication related to the first parameter P1.

For another example, in FIG. 3 and FIG. 5, the operation 306 and the operation 308 may be performed before the operation 302, or may be performed at the same time with the operation 302.

For another example, in FIG. 3 and FIG. 5, the operation 310 and the operation 304 may be performed in a reverse order, or may be performed at the same time.

For another example, in FIG. 3 and FIG. 5, the operation 318 may be performed at the same time with the operation 314, or may be performed before transmitting the second privileged pairing notice, the second parameter P2, and/or a second field indication related to the second parameter P2.

For another example, in FIG. 4, the operation 408 may be performed at the same time with the operation 410 or the operation 412, or may be performed between the operation 410 and the operation 412, or may be performed between the operation 412 and the operation 210.

For another example, in FIG. 7, the operation 708 and the operation 616 may be performed in a reverse order, or may be performed at the same time.

For another example, in FIG. 8, the operation 806 and the operation 804 may be performed in a reverse order, or may be performed at the same time.

For another example, in FIG. 9, the operation 806 and the operation 904 may be performed in a reverse order, or may be performed at the same time.

For another example, in FIG. 10 and FIG. 11, the operation 1018 and the operation 1016 may be performed in a reverse order, or may be performed at the same time.

For another example, in FIG. 11, the operation 1118 may be performed at the same time with the operation 1016 or the operation 1018, or may be performed between the operation 1016 and the operation 1018, or may be performed between the operation 1014 and the operation 1016.

For another example, in FIG. 12 and FIG. 13, the operation 1216 and the operation 216 may be performed in a reverse order, or may be performed at the same time.

For another example, in FIG. 12 and FIG. 13, the operation 214 may be performed at the same time with the operation 1210, or may be performed before transmitting the first parameter P1 or a first field indication related to the first parameter P1.

For another example, in FIG. 13, the operation 1118 and the operation 1216 may be performed in a reverse order, or may be performed at the same time.

For another example, in FIG. 12 and FIG. 13, the operation 318 may be performed at the same time with the operation 1220, or may be performed before transmitting the second parameter P2 or a second field indication related to the second parameter P2.

In addition, the quantity of functional blocks in the Bluetooth communication system 100 and the connection among the functional blocks may be modified based on the actual circuit design requirement, and are restricted to the case illustrated in the aforementioned embodiment.

For another example, in some embodiments where the Bluetooth device set 102 does not need to receive the user's voice or ambient sounds, the first voice receiving circuit 164, the second voice receiving circuit 174, and/or the third voice receiving circuit 184 may be omitted.

For another example, in some embodiments where the Bluetooth device set 102 does not need to playback audio data, the first audio playback circuit 162, the second audio playback circuit 172, and/or the third audio playback circuit 182 may be omitted.

For another example, the number of member devices in the Bluetooth device set 102 may be expanded to a larger number, or the Bluetooth device set 102 may be simplified to contain only the first member device 120 and the second member device 130.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth communication system (100), comprising:
 a Bluetooth host device (110), comprising:
  a host-side communication circuit (111);
  a host-side cypher key generation circuit (115); and
  a processing circuit (117), coupled with the host-side communication circuit (111) and the host-side cypher key generation circuit (115), and arranged to operably control operations of the host-side communication circuit (111) and the host-side cypher key generation circuit (115); and
 a Bluetooth device set (102), comprising at least a first member device (120) and a second member device (130);

wherein the first member device (120) comprises:
  a first communication circuit (121), arranged to operably conduct wireless communications with the host-side communication circuit (111);
  a first cypher key generation circuit (123); and
  a first control circuit (125), coupled with the first communication circuit (121) and the first cypher key generation circuit (123), and arranged to operably generate a first resolvable set identifier (RSI-1) corresponding to the first member device (120) according to a device set identification information corresponding to the Bluetooth device set (102), and arranged to operably generate one or more target Bluetooth advertising packets containing a device information of the first member device (120) and the first resolvable set identifier (RSI-1), and arranged to operably utilize the first communication circuit (121) to transmit the one or more target Bluetooth advertising packets to the Bluetooth host device (110);
wherein the second member device (130) comprises:
  a second communication circuit (131), arranged to operably conduct wireless communications with the host-side communication circuit (111); and
  a second control circuit (135), coupled with the second communication circuit (131), arranged to operably control operations of the second communication circuit (131), and arranged to operably generate a second resolvable set identifier (RSI-2) corresponding to the second member device (130) according to the device set identification information;
wherein the host-side communication circuit (111) is further arranged to operably receive the one or more target Bluetooth advertising packets;
wherein the processing circuit (117) is further arranged to operably control a display device (150) to display a candidate device list, and to display a single device item for representing the Bluetooth device set (102) in the candidate device list, but does not simultaneously display two device items for respectively representing the first member device (120) and the second member device (130) in the candidate device list;
wherein the processing circuit (117) is further arranged to operably identify the first member device (120) as a first privileged device according to a position of the first resolvable set identifier (RSI-1) in the one or more target Bluetooth advertising packets, and after identifying the first member device (120) as the first privileged device, the processing circuit (117) is further arranged to operably transmit a first privileged pairing notice to the first member device (120) through the host-side communication circuit (111), and to operably generate a first cypher key (Key-1);
wherein the first control circuit (125) is further arranged to operably generate a second cypher key (Key-2) corresponding to the first cypher key (Key-1) after the first privileged pairing notice is received by the first communication circuit (121).

2. The Bluetooth communication system (100) of claim 1, wherein the processing circuit (117) is further arranged to operably utilize the host-side communication circuit (111) to transmit a first parameter (P1) or a first field indication to the first member device (120) after identifying the first member device (120) as the first privileged device, and to operably execute a predetermined cypher key algorithm according to the first parameter (P1) to generate the first cypher key (Key-1);

wherein the first control circuit (125) is further arranged to operably execute the predetermined cypher key algorithm according to the first parameter (P1) to generate the second cypher key (Key-2) after the first parameter (P1) or the first field indication is received by the first communication circuit (121).

3. The Bluetooth communication system (100) of claim 2, wherein the first control circuit (125) is further arranged to operably utilize the first communication circuit (121) to transmit the device set identification information corresponding to the Bluetooth device set (102) to the Bluetooth host device (110) after generating the second cypher key (Key-2);
  wherein the second control circuit (135) is further arranged to operably utilize the second communication circuit (131) to transmit the second resolvable set identifier (RSI-2) to the Bluetooth host device (110).

4. The Bluetooth communication system (100) of claim 3, wherein the processing circuit (117) is further arranged to operably identify the second member device (130) as a second privileged device according to the device set identification information and the second resolvable set identifier (RSI-2), and after identifying the second member device (130) as the second privileged device, the processing circuit (117) is arranged to operably transmit a second privileged pairing notice to the second member device (130) through the host-side communication circuit (111).

5. The Bluetooth communication system (100) of claim 4, wherein the processing circuit (117) is further arranged to operably utilize the host-side communication circuit (111) to transmit a second parameter (P2) or a second field indication to the second member device (130) after identifying the second member device (130) as the second privileged device, and to operably execute the predetermined cypher key algorithm according to the second parameter (P2) to generate a third cypher key (Key-3);
  wherein the second control circuit (135) is further arranged to operably execute the predetermined cypher key algorithm according to the second parameter (P2) to generate a fourth cypher key (Key-4) corresponding to the third cypher key (Key-3) after the second parameter (P2) or the second field indication is received by the second communication circuit (131).

6. A Bluetooth device set (102) of a Bluetooth communication system (100), comprising:
  a first member device (120), comprising:
    a first communication circuit (121), arranged to operably conduct wireless communications with a Bluetooth host device (110) in the Bluetooth communication system (100);
    a first cypher key generation circuit (123); and
    a first control circuit (125), coupled with the first communication circuit (121) and the first cypher key generation circuit (123), and arranged to operably generate a first resolvable set identifier (RSI-1) corresponding to the first member device (120) according to a device set identification information corresponding to the Bluetooth device set (102), and arranged to operably generate one or more target Bluetooth advertising packets containing a device information of the first member device (120) and the first resolvable set identifier (RSI-1), and arranged to operably utilize the first communication circuit (121) to transmit the one or more target Bluetooth advertising packets to the Bluetooth host device (110);

a second member device (130), comprising:
- a second communication circuit (131), arranged to operably conduct wireless communications with the Bluetooth host device (110); and
- a second control circuit (135), coupled with the second communication circuit (131), and arranged to operably control operations of the second communication circuit (131), and arranged to operably generate a second resolvable set identifier (RSI-2) corresponding to the second member device (130) according to the device set identification information;

wherein the Bluetooth host device (110) controls a display device (150) to display a candidate device list, and to display a single device item for representing the Bluetooth device set (102) in the candidate device list, but does not simultaneously display two device items for respectively representing the first member device (120) and the second member device (130) in the candidate device list;

wherein the Bluetooth host device (110) identifies the first member device (120) as a first privileged device according to a position of the first resolvable set identifier (RSI-1) in the one or more target Bluetooth advertising packets, and after identifying the first member device (120) as the first privileged device, the Bluetooth host device (110) transmits a first privileged pairing notice to the first member device (120) and generates a first cypher key (Key-1);

wherein the first control circuit (125) is further arranged to operably generate a second cypher key (Key-2) corresponding to the first cypher key (Key-1) after the first privileged pairing notice is received by the first communication circuit (121).

7. The Bluetooth device set (102) of claim 6, wherein the Bluetooth host device (110) further transmits a first parameter (P1) or a first field indication to the first member device (120) after identifying the first member device (120) as the first privileged device;

wherein the first control circuit (125) is further arranged to operably execute a predetermined cypher key algorithm according to the first parameter (P1) to generate the second cypher key (Key-2) after the first parameter (P1) or the first field indication is received by the first communication circuit (121).

8. The Bluetooth device set (102) of claim 7, wherein the first control circuit (125) is further arranged to operably utilize the first communication circuit (121) to transmit the device set identification information corresponding to the Bluetooth device set (102) to the Bluetooth host device (110) after generating the second cypher key (Key-2);

wherein the second control circuit (135) is further arranged to operably utilize the second communication circuit (131) to transmit the second resolvable set identifier (RSI-2) to the Bluetooth host device (110).

9. The Bluetooth device set (102) of claim 8, wherein the Bluetooth host device (110) identifies the second member device (130) as a second privileged device according to the device set identification information and the second resolvable set identifier (RSI-2), and transmits a second privileged pairing notice to the second member device (130).

10. The Bluetooth device set (102) of claim 9, wherein the Bluetooth host device (110) further transmits a second parameter (P2) or a second field indication to the second member device (130) after identifying the second member device (130) as the second privileged device, and generates a third cypher key (Key-3);

wherein the second control circuit (135) is further arranged to operably execute the predetermined cypher key algorithm according to the second parameter (P2) to generate a fourth cypher key (Key-4) corresponding to the third cypher key (Key-3) after the second parameter (P2) or the second field indication is received by the second communication circuit (131).

\* \* \* \* \*